US008275994B2

(12) United States Patent
Funahashi et al.

(10) Patent No.: US 8,275,994 B2
(45) Date of Patent: Sep. 25, 2012

(54) INFORMATION STORAGE APPARATUS AND PASSWORD COLLATION METHOD

(75) Inventors: Takeshi Funahashi, Saitama (JP); Toshiro Nagashima, Kanagawa (JP); Sakiko Nagato, Tokyo (JP)

(73) Assignee: Sony Corporation, Tokyo (JP)

( * ) Notice: Subject to any disclaimer, the term of this patent is extended or adjusted under 35 U.S.C. 154(b) by 1149 days.

(21) Appl. No.: 11/233,084

(22) Filed: Sep. 22, 2005

(65) Prior Publication Data
US 2006/0075485 A1    Apr. 6, 2006

(30) Foreign Application Priority Data

Oct. 1, 2004 (JP) ............... P2004-290723
Apr. 28, 2005 (JP) ............... P2005-132845

(51) Int. Cl.
*G06F 21/00*       (2006.01)
(52) U.S. Cl. ........................................... 713/183
(58) Field of Classification Search .............. 713/172, 713/183, 184, 193; 726/9, 5, 18–20
See application file for complete search history.

(56) References Cited

U.S. PATENT DOCUMENTS

| 6,026,491 | A   | * | 2/2000  | Hiles .................... 726/18 |
| 7,272,723 | B1  |   | 9/2007  | Abbott et al. |
| 7,434,251 | B2  | * | 10/2008 | Ooi et al. .................. 726/9 |
| 7,467,403 | B2  | * | 12/2008 | Harris .................... 726/6 |
| 7,478,248 | B2  | * | 1/2009  | Ziv et al. .................. 713/193 |
| 2002/0152070 | A1 | * | 10/2002 | Oda .................... 704/246 |
| 2004/0139255 | A1 | * | 7/2004  | Cheng .................... 710/74 |
| 2004/0139331 | A1 | * | 7/2004  | Sanai et al. .................... 713/184 |
| 2005/0289645 | A1 | * | 12/2005 | Hori .................... 726/7 |
| 2008/0059660 | A1 | * | 3/2008  | Cheng .................... 710/14 |

FOREIGN PATENT DOCUMENTS

JP          07-129294          6/1995
(Continued)

OTHER PUBLICATIONS

Japanese Patent Office Action corresponding to Japanese Serial No. 2005-132845 dated Oct. 5, 2010.
(Continued)

*Primary Examiner* — Beemnet Dada
(74) *Attorney, Agent, or Firm* — SNR Denton US LLP

(57) ABSTRACT

A password is effectively prevented from being leaked to enhance the degree of security and, at the same time, can be input without difficulty. There is provided a removable information storage apparatus equipped with a predetermined interface for connecting itself to an external appliance and a security section with limited accesses from the external appliance, which includes a password input unit to be used that inputs a password of a predetermined number of words to be notified only to the information storage apparatus without being output to the external appliance connected to it by way of the predetermined interface, a password collating unit that collates the password input by way of the password input unit, and an access authorizing unit that authorizes an access to the security section from the external appliance connected to it by way of the predetermined interface in response to the collation of the password by the password collating unit. The password input unit is adapted to be used for inputting a password of not greater than a predetermined number of words as the password to be collated by the password collating unit, and the password collating unit is adapted to collate the password of not greater than the predetermined number of words input by way of the password input unit.

20 Claims, 20 Drawing Sheets

FOREIGN PATENT DOCUMENTS

| | | |
|---|---|---|
| JP | 09-185426 | 7/1997 |
| JP | 09-212281 | 8/1997 |
| JP | 10-187337 | 7/1998 |
| JP | 2000-099728 | 4/2000 |
| JP | 2000-163547 | 6/2000 |
| JP | 2000-193475 | 7/2000 |
| JP | 2001-056795 | 2/2001 |
| JP | 2001-338271 | 12/2001 |
| JP | 2002-279373 | 9/2002 |
| JP | 2002-535746 | 10/2002 |
| JP | 2003-067302 | 3/2003 |
| JP | 2003-524842 | 8/2003 |
| JP | 2004-021581 | 1/2004 |
| JP | 2004-080174 | 3/2004 |
| JP | 2004-272832 | 9/2004 |
| JP | 2005-209038 | 8/2005 |
| WO | 01/61692 | 8/2001 |
| WO | 2004015515 | 2/2004 |

OTHER PUBLICATIONS

Japanese Patent Office Action corresponding to Japanese Serial No. 2005-132845 dated Dec. 7, 2010.

* cited by examiner

60

| y \ x | 00 | 01 | 02 | 03 | 04 |
|---|---|---|---|---|---|
| 00 | 0 | A | N | a | n |
| 01 | 1 | B | O | b | o |
| 02 | 2 | C | P | c | p |
| 03 | 3 | D | Q | d | q |
| 04 | 4 | E | R | e | r |
| 05 | 5 | F | S | f | s |
| 06 | 6 | G | T | g | t |
| 07 | > | > | > | > | > |
| 08 | 7 | H | U | h | u |
| 09 | 8 | I | V | i | v |
| 10 | 9 | J | W | j | w |
| 11 | + | K | X | k | x |
| 12 | − | L | Y | l | y |
| 13 | = | M | Z | m | z |
| 14 | CR | CR | CR | CR | CR |
| 15 | DEL | DEL | DEL | DEL | DEL |

FIG.3

| y \ x | 00 | 01 | 02 | 03 | 04 |
|---|---|---|---|---|---|
| 00 | 0 | A | N | a | n |
| 01 | 1 | B | O | b | o |
| 02 | 2 | C | P | c | p |
| 03 | 3 | D | Q | d | q |
| 04 | 4 | E | R | e | r |
| 05 | 5 | F | S | f | s |
| 06 | 6 | G | T | g | t |
| 07 | > | > | > | > | > |
| 08 | 7 | H | U | h | u |
| 09 | 8 | I | V | i | v |
| 10 | 9 | J | W | j | w |
| 11 | + | K | X | k | x |
| 12 | − | L | Y | l | y |
| 13 | = | M | Z | m | z |
| 14 | CR | CR | CR | CR | CR |
| 15 | DEL | DEL | DEL | DEL | DEL |

FIG.20A

| y \ x | 00 | 01 | 02 | 03 |
|---|---|---|---|---|
| 00 | 0 | 4 | 8 | C |
| 01 | 1 | 5 | 9 | D |
| 02 | 2 | 6 | A | E |
| 03 | 3 | 7 | B | F |
| 04 | CR | CR | CR | CR |
| 05 | DEL | DEL | DEL | DEL |

FIG.20B

INFORMATION STORAGE APPARATUS AND PASSWORD COLLATION METHOD

CROSS REFERENCES TO RELATED APPLICATIONS

The present invention contains subject matter related to Japanese Patent Application JP 2004-290723 filed in the Japanese Patent Office on Oct. 1, 2004, and Japanese Patent Application JP 2005-132845 filed in the Japanese Patent Office on Apr. 28, 2005, the entire contents of which being incorporated herein by reference.

BACKGROUND OF THE INVENTION

1. Field of the Invention

The present invention relates to a removable information storage apparatus connected to an external appliance by way of a predetermined interface, to which data can be written and from which data can be read by means of a predetermined file system. More particularly, the present invention relates to an information storage apparatus having an enhanced degree of security for accessing a security means that the information storage apparatus is provided with and a password collation method to be used with such an information storage apparatus.

2. Description of the Related Art

Removable information storage apparatus including an information storage means connected to an external appliance such as a PC (personal computer) by way of a predetermined interface, to which data can be written and from which data can be read by means of a predetermined file system are becoming popular. Such information storage apparatus has a large storage capacity and allows to be accessed at high speed for writing data to and reading data from it if compared with magnetic disc storage mediums that have hitherto been very popular because they include a semiconductor memory such as a large capacity flash memory as an information storage means.

Such information storage apparatus control accesses to the information storage means so that any person other than the user who bought the information storage apparatus may not use it. For known information storage apparatus, it is necessary to install an application software dedicated to control accesses to the information storage means. In other words, such an application software has to be installed and a password has to be registered in all the PCs that are adapted to use the information storage apparatus.

For example, when a user purchases such an information storage apparatus, he or she installs an application software for controlling accesses to the information storage means in all the PCs that are adapted to be connected to the information storage apparatus for use and registers a password. When the user actually uses the information storage apparatus, he or she can control accesses to the information storage means by inputting the password by way of an input interface such as the keyboard of one of the PCs (see, referred to Patent Document 1: PCT Laid-Open Publication No. 2003-524842).

Generally, techniques of building a security system that uses a password input by the user are advantageous in terms of suppressing the cost of building the security system because such a security system requires neither a costly security device nor a costly security application software. Such a security system is also advantageous because the user can use it conveniently if he or she selects numbers and/or characters that he or she can memorize with ease as password.

However, a password that is convenient to the user is mostly formed by arranging a string of characters that the user can memorize with ease and hence may be accompanied by a problem that a fraudulent user can also guess it with ease. For example, the user may highly probably select his or her date of birth or some other piece of information that is closely related to the user for the password. Then, the fraudulent user may be able to easily guess the password.

Additionally, the length of a password is mostly limited in view of the easiness with which the user can memorize it. For example, a four digits number is often used as password. When the length of passwords is limited in such a way and if an application software that allows a fraudulent user to generate and input four digits numbers randomly without limitation for analyzing a password, the fraudulent user may eventually succeed in completely analyzing and acquiring the password in a relatively short period of time.

In a security system where the information storage means of an information storage apparatus can be accessed by inputting a password by way of the keyboard of a PC connected to the information storage apparatus, the password may be skimmed off by injecting a computer virus such as Trojan Horse designed to fraudulently acquire passwords.

As described above, security systems designed to authorize an access to the information storage means of an information storage apparatus when the right password is input from a PC connected to the information storage apparatus can be reduced to security systems of a low degree of security that are very fragile in terms of security.

SUMMARY OF THE INVENTION

In view of the above identified circumstances, it is therefore desirable to provide an information storage apparatus that ensures an enhanced degree of security, while maintaining the low cost and the convenience to the user of security systems that utilizes passwords and also a password collation method to be used for such an information storage apparatus.

According to the invention, there is provided a removable information storage apparatus equipped with a predetermined interface for connecting itself to an external appliance and a security means with limited accesses from the external appliance, the apparatus including: a password input means for inputting a password of a predetermined number of words to be notified only to the information storage apparatus without being output to the external appliance connected to it by way of the predetermined interface; a password collating means for collating the password input by way of the password input means; and an access authorizing means for authorizing an access from the external appliance connected to it by way of the predetermined interface to the security means in response to the collation of the password by the password collating means.

The password input means is adapted to be used for inputting a password of not greater than a predetermined number of words as the password to be collated by the password collating means; and the password collating means is adapted to collate the password of not greater than the predetermined number of words input by way of the password input means.

According to the present invention, there is provided a password collation method to be used for a removable information storage apparatus equipped with a predetermined interface for connecting itself to an external appliance and a security means with limited accesses from the external appliance, the method including: a password input step of inputting a password of a predetermined number of words to be notified only to the information storage apparatus without being output to the external appliance connected to it by way of the predetermined interface; a password collating step of collating the password input in the password input step; and an access authorizing step of authorizing an access from the external appliance connected to the removable information storage apparatus by way of the predetermined interface to the security means in response to the collation of the password in the password collating step.

The password input step is adapted to be used for inputting a password of not greater than a predetermined number of words as the password to be collated in the password collating step; and the password collating step is adapted to collate the password of not greater than the predetermined number of words input in the password input step.

Thus, a password of not greater than a predetermined number of words that is input by the password input means of an information storage apparatus according to the invention is notified only to the information storage apparatus without being output to an external appliance connected to it by way of a predetermined interface and the external appliance is authorized to access the security means of the information storage apparatus as a result of collating the input password.

With this arrangement, a convenient password of a conventional type may be used and completely prevented from being leaked to the outside by way of the external appliance. Thus, it is possible to protect the storage means with a highly enhanced level of security and a collating process is executed when a password of a number of words not greater than the predetermined number of words is input, to eliminate the difficulty of inputting a password even when passwords are formed by an increased number of words in order to raise the level of security.

Additionally, a password of a number of words not greater than the predetermined number of words is specified randomly from a password of the predetermined number of words. Thus, it is possible to reliably enhance the confidentiality of a password, while eliminating the difficulty of inputting a password.

BRIEF DESCRIPTION OF THE DRAWINGS

FIG. 3 is a schematic illustration of the password conversion table stored in the storage medium;

FIG. 20 is a schematic illustration of a technique of dynamically acquiring tables of different kinds from a PC connected to the storage medium.

DETAILED DESCRIPTION OF THE PREFERRED EMBODIMENTS

Now, the present invention will be described in greater detail by referring to the accompanying drawings that illustrate preferred embodiments of the invention, although the present invention is by no means limited to the embodiments described below, which may be modified and/or altered in various different ways without departing from the spirit and scope of the invention.

[First Embodiment]

Figure 1:
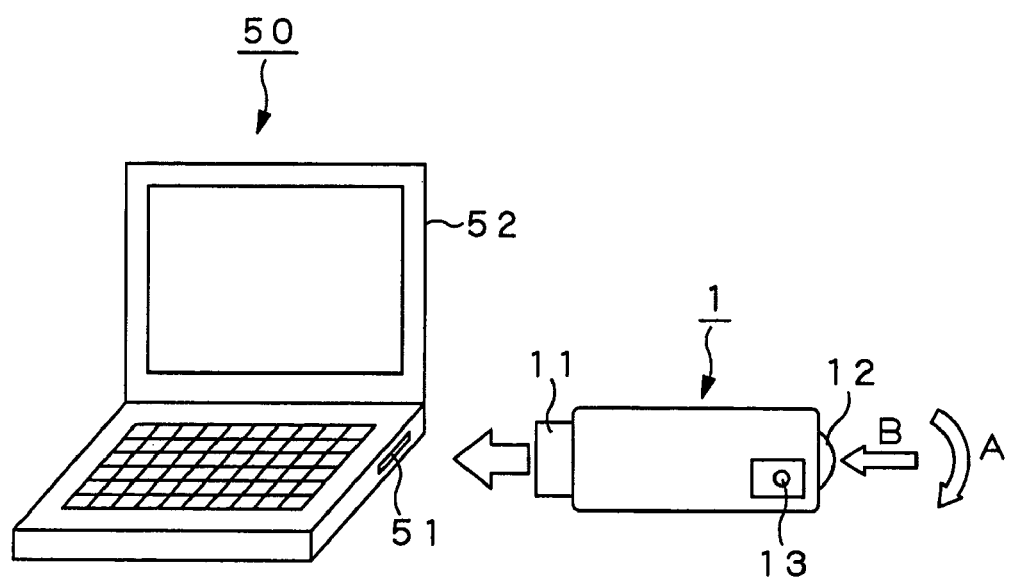
FIG. 1 is a schematic illustration of a mode of utilization of a storage medium, which is the first embodiment of the present invention.

FIG. 1 is a schematic illustration of a mode of utilization of a storage medium 1, which is the first embodiment of removable information storage apparatus according to the present invention.

As shown in FIG. 1, the storage medium 1 becomes ready for use when the USB (universal serial bus) plug 11 it includes is put into the USB jack 51 that PC (personal computer) 50, which is an external appliance, has. Thus, the storage medium 1 operates as a data storage, or an external memory, of the PC 50 when it is directly connected to the PC 50, which is an external appliance.

The PC 50, to which the storage medium 1 is connected, operates under the control of a predetermined OS (operating system). The PC 50 also includes a monitor 52 for displaying the outcome of a process executed by the PC or the like. The monitor 52 may also be used to display candidate passwords to be used for selecting a right password when the password of the storage medium 1 is input.

While the storage medium 1 is connected to the PC 50, which is an external appliance, by way of a USB interface, the present invention is by no means to the use of such a connection interface. In other words, any connection interface may be used for the storage medium 1 so long as the PC 50 has it.

Referring to FIG. 1, the storage medium 1 includes a jog dial 12 so that the user may input a password for obtaining authorization of an access to a security means, which may be a flash memory or a PKI controller as will be described in greater detail hereinafter, by means of the jog dial 12. The jog dial 12 is a mechanical input means that can be rotated in the direction indicated by arrow A and depressed in the direction indicated by arrow B in FIG. 1. For example, the user can select a desired character of the character string of the password by rotating the jog dial in the direction of arrow A and finalizes the selection of the character as one of the characters of the character string of the password by depressing the jog dial 12 in the direction of arrow B.

However, the present invention is by no means limited in terms of the type of the password input means of the storage medium 1, which is a jog dial 12 in the above description. In other words, any input means that can be mounted on the storage medium 1 and operated to select each of the characters of the character string of a password and finalize the selection of each of the characters may be used for the purpose of the present invention.

As shown in FIG. 1, the storage medium 1 also includes an input confirmation lamp 13 for confirming that the operation of inputting a character of the password by means of the jog dial 12 is finalized. The input confirmation lamp 13 is typically formed by using a light emitting diode that emits red light. It is turned on as the jog dial 12 is depressed in the direction of arrow B to finalize the selection of a component of the password.

Now, the configuration of the storage medium 1 will be described by referring to FIG. 2. The storage medium 1 has a USB storage controller 20, a PKI (public key infrastructure) controller 30 and a flash memory 40 in addition to the USB plug 11, the jog dial 12 and the input confirmation lamp 13, which are already described above.

The USB storage controller 20 is an IC (integrated circuit) adapted to execute processes mainly relating to the storage feature of the storage medium 1, whereas the PKI controller 30 is an IC adapted to execute security processes using a private key on the basis of the PKI. The USB storage controller 20 and the PKI controller 30 are connected to each other by way of the serial I/F (interface) 29 and the serial I/F 37 they respectively have. Access to the PKI controller 30 from the USB storage controller 20 is normally limited because it needs to be provided with an enhanced level of security for reasons including that it holds a private key. The PKI controller 30 is so arranged that it is possible to log on according to the result of an authentication process executed on the password input from the jog dial 12.

The USB storage controller 20 by turn includes an interface controller 21, a jog dial controller 22, a ROM (read only memory) 23, a RAM (random access memory) 24, a CPU (central processing unit) 25, a password register 26, a confirmation lamp controller 27, a memory controller 28 and a serial I/F 29.

As pointed out above, the USB plug 11 is an USB interface for connecting itself to the USB jack 51 of the PC 50 shown in FIG. 1. The storage medium 1 connected to the PC 50 by way of the USB plug 11 can operate for data communications with the PC 50 as power is supplied to it from the PC 50.

As pointed out above, the jog dial 12 is a mechanism that can be rotated in the direction of arrow A and depressed in the direction of arrow B. Thus, the jog dial 12 includes a rotation detection mechanism for detecting its rotatory direction that changes as it is operated to rotate in the direction of arrow A and a depression detection mechanism for detecting its depressed position as it is depressed in the direction of arrow B. The rotation detection mechanism and the depression detection mechanism are adapted to output the respective values they detect to the jog dial controller 22.

The input confirmation lamp 13 is typically formed by using a light emitting diode that emits red light. It is turned on under the control of the confirmation lamp controller 27 as the latter is notified by the jog dial controller 22 of that a depressing operation signal is supplied from the depression detection mechanism of the jog dial 12. The user can visually confirm that the password is input correctly by seeing that the input confirmation lamp 13 is turned on. The input confirmation lamp 13 is turned on/off by the number of times that corresponds to the number of words of the password stored in the password register 26 by way of the jog dial 12 under the control of the confirmation lamp controller 27.

The interface controller 21 controls the operation of transferring data between the PC 50 and the storage medium 1 that is conducted by way of the USB plug 11 according to the USB protocol.

The jog dial controller 22 generates a rotary operation signal from the detected values on the rotatory direction and the rotary speed as detected by the rotation detection mechanism of the jog dial 12. The jog dial controller 22 also generates a depressing operation signal from the detected value in the depressing operation as detected by the depression detection mechanism of the jog dial 12. Then, the jog dial controller 22 supplies the rotary operation signal and the depressing operation signal to the CPU 25.

The ROM 23 is a memory that stores the firmware and the file system to be executed by the CPU 25. The ROM 23 also stores a password conversion table as shown in FIG. 3. The password conversion table 60 illustrated in FIG. 3 is a conversion table adapted to identify an alphabet code (A through Z, a through z), a numerical code (0 through 9), a function code (>, CR, DEL) or a sign code (+, −, =) by defining xy coordinates. Appropriate characters and function codes may be read out from the password conversion table 60 stored in the ROM 23 by the CPU 25 according to the rotary operation signal and the depressing operation signal supplied from the jog dial controller 22 to the CPU 25.

In the following description, the alphabet codes (A through Z, a through z), the numerical codes (0 through 9), the function codes (>, CR, DEL) and the sign code (+, −, =) are generically referred to as character codes.

The password conversion table 60 is prepared on an assumption that the password registered by the user is composed of characters. However, the present invention is by no means limited by the type of password.

The RAM 24 is a working memory of the CPU 25. The CPU 25 executes the firmware and the file system stored in the ROM 23 to comprehensively control the operation of the storage medium 1. The CPU 25 controls the memory controller 28 according to the file system so as make the storage medium 1 operate as data storage when it writes and stores the data transferred to it from the PC 50 by way of the USB plug 11 in the flash memory 40 and also reads and transfers some or all of the data stored in the flash memory 40 to the PC 50 by way of the USB plug 11.

The CPU 25 reads out a character code from, for instance, the password conversion table 60 stored in the ROM 23 according to the rotary operation signal supplied from the jog dial controller 22. The PC 50 that is connected to the storage medium 1 conducts a polling operation of requesting the CPU 25 to transmit information on the positions of the character codes in the password conversion table 60 that are read out periodically by the CPU 25. The CPU 25 transmits information on the positions of the character codes in the password conversion table 60 it reads out to the PC 50 via the USB jack 11 in response to the polling operation of the PC 50.

The positions of the character codes in the password conversion table 60 transmitted to the PC 50 are displayed on the monitor 52 by the predetermined application software that is started in the PC 50 by way of the password table of the PC 50 that is identical with the password conversion table 60. Then, the user can see the positions of the character codes in the password table that is displayed on the monitor 52 and visually confirm the characteristic codes he or she selected by operating the jog dial 12 him- or herself, whichever appropriate.

Additionally, the CPU 25 finalizes the character codes read out from the password conversion table 60 stored in the ROM 23 as character string of the password in response to the depressing operation signal supplied from the jog dial controller 22. The information that the character codes read out by the CPU 25 are finalized as character string of the password in response to the depressing operation signal is not transmitted to the outside of the storage medium 1, or the PC 50.

The password register 26 temporarily stores the password that is input by operating the jog dial 12.

The confirmation lamp controller 27 controls the input confirmation lamp 13 that is turned on/off under the control of the CPU 25 as described above.

The memory controller 28 is controlled by the file system read out by the CPU 25 from the ROM 23. It controls the operation of writing data to the flash memory 40 and reading data from the flash memory 40, while managing the data to be stored in the flash memory 40 as file.

The flash memory 40 is a storage section of the storage medium 1 that is adapted to store the data that are managed by the memory controller 28 as file in the file system read out by the CPU 25 from the ROM 23. The memory region of the flash memory 40 includes an open area 40a that can be accessed from the PC 50 without limitation when the storage medium 1 is connected to the PC 50 and a security area 40b that can be accessed from the PC 50 only when the password is input from the jog dial 12.

The open area 40a of the flash memory 40 stores the application software for inputting the password (to be referred to simply as input application software hereinafter) that is to be started when the password is input by means of the jog dial 12 of the storage medium 1.

On the other hand, the PKI controller 30 includes a PKI (public key infrastructure) engine 31, a DES (data encryption standard) engine 32, an EEPROM (electrically erasable programmable read only memory) 33, a ROM 34, a RAM 35, a CPU 36 and a serial I/F 37 and is connected to the USB storage controller 20 by way of the serial I/F 37 as pointed out above.

The PKI controller 30 can log on by way of the USB storage controller 20 when the password input by way of the jog dial 12 is authenticated for the purpose of executing a process for security in the storage medium 1.

The PKI engine 31 executes processes for security using a private key according to the PKI. Such processes typically include data signing processes, data verification processes, data encryption processes, decryption processes of decrypting the encrypted data that are encrypted by a public key. The PKI engine 31 executes processes including a data signing process, a data encryption process and a decryption process of decrypting the encrypted data. Additionally, when a key generation command is transmitted from the CPU 36, the PKI engine 31 generates a key pair of a private key and a public key according to the RSA (Rivest Shamir Adleman) system. The generated private key is transferred to a predetermined region of the EEPROM 33, whereas the generated public key is delivered to the PC 50. The private key and the public key are generated as the user initializes the storage medium 1 for use.

The PKI system that is applied to the PKI engine 31 is not limited to the above described RSA system. For example, the Deffy Helleman (DH) system or the elliptic curve cryptography (ECC) system may alternatively be used.

The DES engine 32 executes encryption processes and decryption processes, using a DES key. The DES engine 32 typically generates two 8-byte DES keys according to the triple DES system for strengthening keys by executing consecutively three times an encryption process, using the DES, and writes the generated triple DES key in the EEPROM 33. As the DES engine 32 generates a private key and a public key as PKI keys, it reads out the triple DES key from the EEPROM 33, encrypts the private key and generates encryption key data. The encryption key data and the public key that are generated are then output to the outside of the PKI controller 30 and stored in the flash memory 40.

When the private key is used in the DES engine 32 for processes such as data signing processes, data encryption processes and data decryption processes for decrypting data encrypted by the public key, the encryption key data that are stored in the flash memory 40 are read out into the DES engine 32 and the triple DES key is read out from the EEPROM 33 to decrypt the private key.

Thus, it is possible to reduce the capacity of the EEPROM 33 and prepare PKI keys without limitation by encrypting the private key by means of the DES keys.

While the DES engine 32 is adapted to encrypt the private key by means of the triple DES system in the above description, it may be needless to say that it may encrypt the private key, using only an ordinary DES key.

The EEPROM 33 is a ROM in which information can be written and the information written there can be electrically erased. It is adapted to store the private key generated by the PKI engine 31 and the triple DES key generated by the DES engine 32.

The ROM 34 stores the firm ware to be executed by the CPU 36 and the RAM 35 is a working memory of the CPU 36.

The CPU 36 controls the operation of the PKI controller 30. For example, it comprehensively controls the operation of the PKI engine 31 and that of the DES engine 32.

When logging on and accessing the PKI controller 30 that is adapted to execute processes relating to security in the storage medium 1 having the above described configuration, it is necessary to input the password without fail and execute an authentication process by means of the USB storage controller 20. The process of inputting and authenticating the password is also required when accessing the security area 40b of the flash memory 40.

<Password Registration Process>

Now, the password registration process for registering the password to be used for executing a password authentication process in the storage medium 1 will be described below by referring to the flow chart of FIG. 4.

Figure 5:
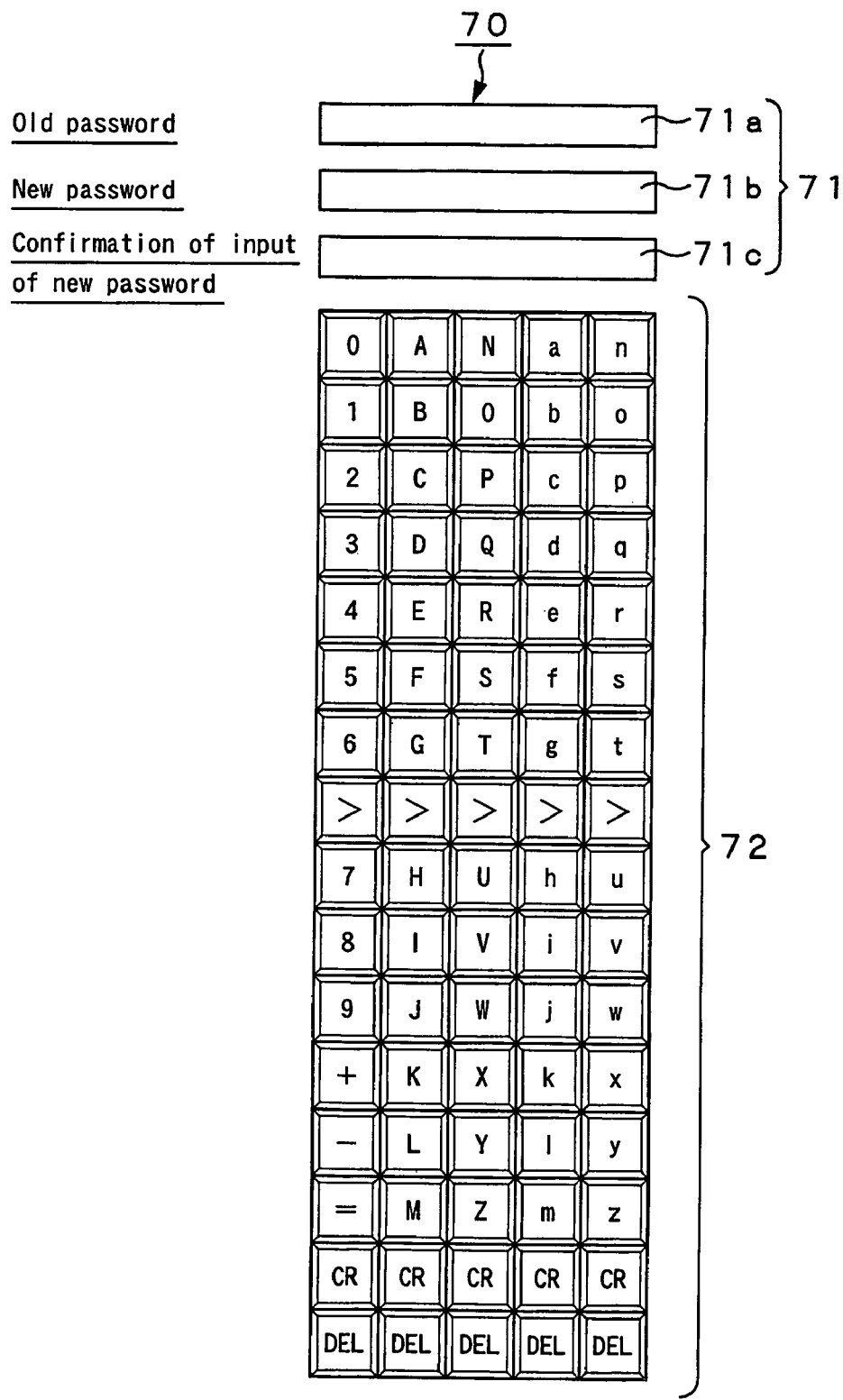
FIG. 5 is an exemplary image displayed on the monitor of a PC (personal computer) connected to the storage medium for a password input operation.

Firstly, in Step S1, the user connects the storage medium 1 to the PC 50 and selects a password registration mode. As a password registration mode is selected, the monitor 52 of the PC 50 typically displays a password input image 70 as shown in FIG. 5, requesting the user to input the currently effective password and then a password authentication process is executed by the USB controller 20. As shown FIG. 5, the password input image 70 includes a password input field 71 to be used for inputting a password and a password selection table 72 to be used for selecting the password to be input. The password selection table 72 is a table that corresponds to the password conversion table 60 stored in the ROM 23 of the USB storage controller 20 and is held in the PC 50.

When the user registers a password for the first time in the storage medium 1, he or she uses the default password that the manufacturer of the storage medium 1 registered at the time of shipment from the manufacturing plant. The password that is currently effective is input to the old password input field 71a and, if it is authenticated, the processing operation proceeds to Step S2. If the password is not authenticated, an operation error occurs.

If the currently effective password is authenticated, the user can log on to the PKI controller 30 by way of the USB storage controller 20 in Step S2.

Then, in Step S3, the CPU 25 prepares for registration of a new password. More specifically, the CPU 25 erases (clears) the contents of the password register 26. At the same time, the PC 50 displays a cursor at the upper left corner of the password selection table 72 illustrated in FIG. 5, or at the position of numeral "0", on the monitor 52.

In Step S4, the PC 50 requests a character code to be input from the USB storage controller 20 of the storage medium 1. The PC 50 repeats the request for a character code periodically as shown in FIG. 4.

In Step S5, the user operates the jog dial 12 and rotates it to select a character code from the password selection table 72. As the jog dial 12 is operated and rotated, a rotary operation signal is supplied from the jog dial controller 22 to the CPU 25. The CPU 25 reads out the character code from the password conversion table 60 stored in the ROM 23 according to the supplied rotary operation signal.

Figure 6:
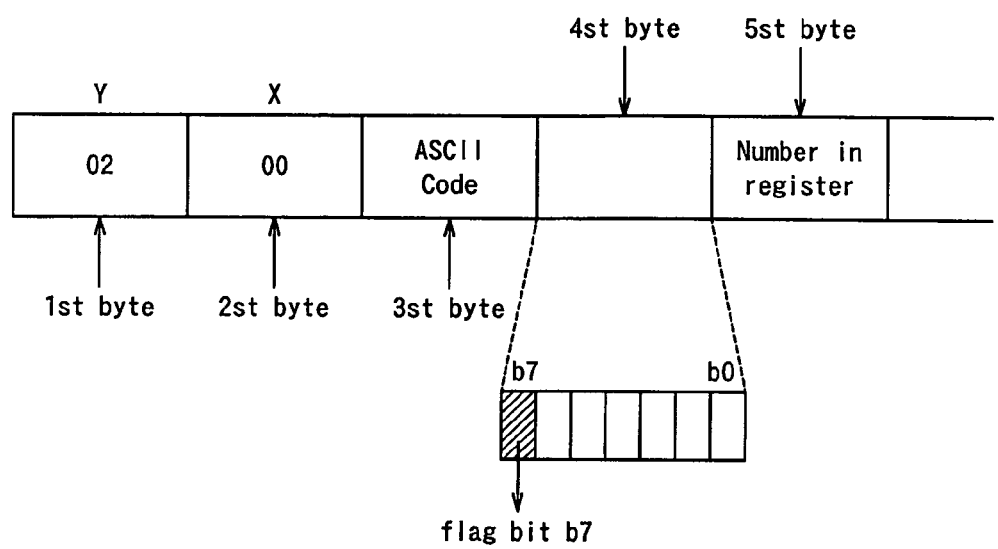
FIG. 6 is a schematic illustration of the data structure of the request-responding data that the storage medium transmits.

In Step S6, the CPU 25 generates request-responding data in response to the request of the PC 50 for a character code and transmits it to the PC 50. The request-responding data typically has a data structure as shown in FIG. 6. Referring to FIG. 6, the request-responding data has at least a 2-byte data region for describing a position code, a 1-byte data region for describing an ASCII code, a 1-byte data region for describing a completion flag and a 1-byte data region for describing the number of passwords in the password register 26.

The data region of the first byte and the second byte of the request-responding data is used to describe the y coordinate (00 through 15) and the x coordinate (00 through 04) of the position code in the password conversion table 60 of FIG. 3 so that the position of the character code that is currently selected by the rotary operation of the jog dial 12 may be identified.

As described above, since the PC 50 holds the password selection table 72 that corresponds to and is practically identical with the password conversion table 60, it is possible to identify the currently selected position and the monitor 52 can show it by means of a cursor by acquiring the position code.

The ASCII code for identifying the substance of the character code is described in the data region of the third byte of the request-responding data. The PC 50 can identify the character code that is currently specified when it receives the ASCII code.

In Step S7, the PC 50 detects the position code in the transmitted request-responding data and moves the cursor on the password selection table 72.

If the jog dial 12 is depressed in Step S8, the process proceeds to Step S9. If, on the other hand, the jog dial 12 is not depressed, the process returns to Step S5 to continue the rotary operation of the jog dial 12 for selecting a desired character code.

In Step S9, the user who selected the desired character code by the rotary operation depresses the jog dial 12. As the jog dial 12 is depressed, a depressing operation signal is supplied from the jog dial controller 22 to the CPU 25. More specifically, an operation as illustrated in the flow chart of FIG. 7 is executed in Step S9.

Figure 7:
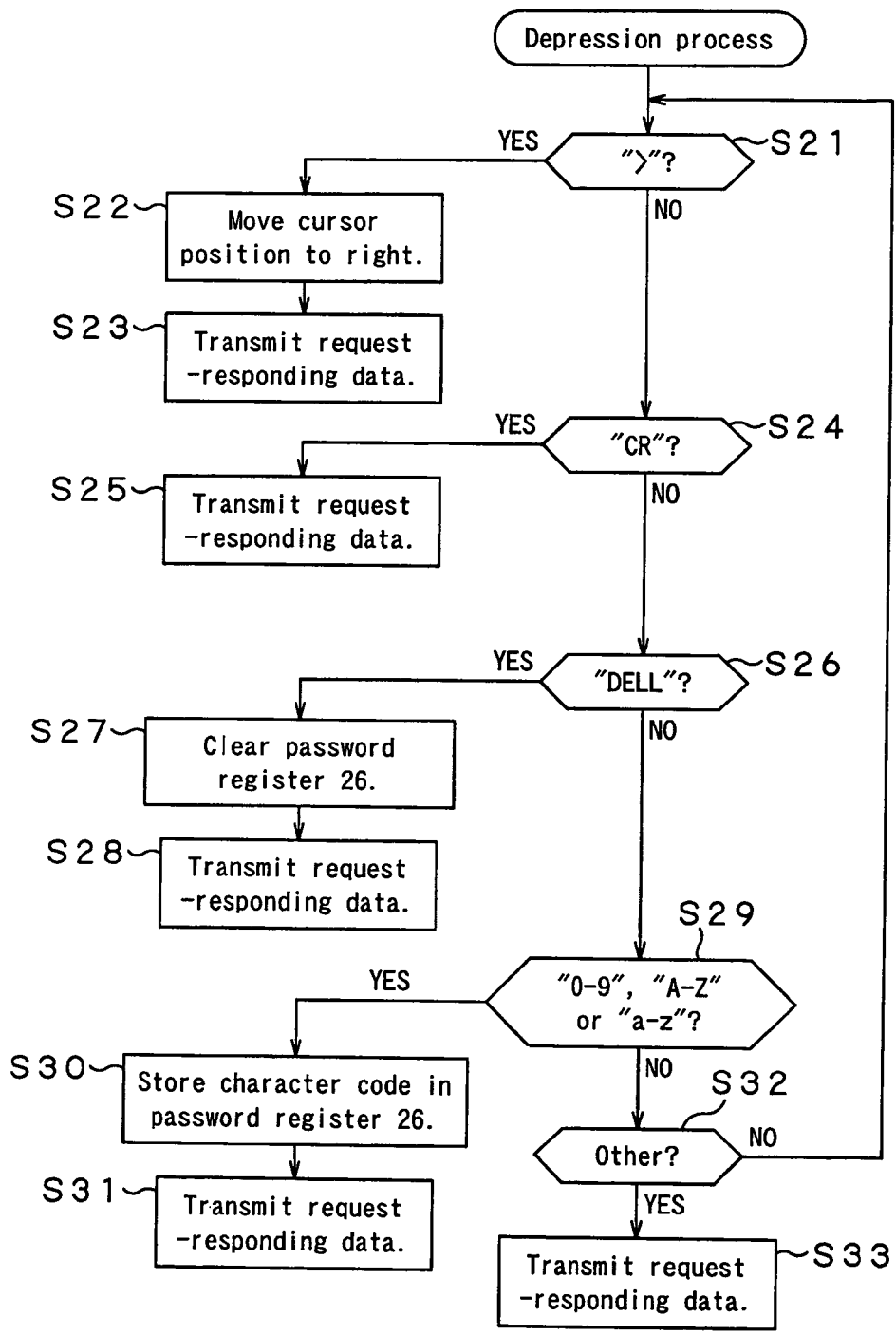
FIG. 7 is a flow chart of the operation that is carried out when the jog dial of the storage medium is depressed.

Referring to FIG. 7, in Step S21, the CPU 25 determines if the jog dial 12 is depressed in a state where the character code ">" is read out from the ROM 23 and a depressing operation signal is supplied from the jog dial controller 22 or not. If a depressing operation signal is supplied, it proceeds to Step S22. If, on the other hand, no depressing operation signal is supplied, it proceeds to Step S24.

In Step S22, the CPU 25 moves the cursor to the right from the coordinate position of the character code that is currently being read out on the password conversion table 60. For example, if the x-coordinate is "01" and the y-coordinate is "07" and a depressing operation signal is supplied to the CPU 25, the latter moves the cursor to the position of the x-coordinate "02". If the x-coordinate is "04", the CPU 25 moves the cursor to the position of the x-coordinate "00".

The function code ">" is for shifting the rotary direction of the jog dial 12 on the password conversion table 60. Normally, as the jog dial 12 is rotated, it can move only in the direction of the x-coordinate. In other words, if the x- and y-coordinates are (x, y), it is only possible for the jog dial 12 to move in the direction of (00, 00)Z,900 (01, 00)Z,900 (02, 00)Z,900 (03, 00)Z,900 (04, 00)Z,900 (00, 01)Z,900 ... (03, 15), Z,900 (04, 15). Thus, a considerable amount of rotary motion is required to move from "A" on (01, 00) to "H" on (01, 08).

On the other hand, if the function code ">" is specified, the rotary operation of the jog dial 12 comes to agree with a movement in the direction of the y-coordinate on the password conversion table 60. For example, assume that the user wants to move from the character code "E" at the coordinates of (01, 04) to the character code "L" at the coordinates of (01, 12). Then, the user rotates the jog dial 12 to move the cursor to the character code ">" at the coordinates of (00, 07) and depresses the jog dial 12.

As a result of depressing the jog dial 12, the coordinates move to (01, 07) and the x-coordinate is fixed to "01". In other words, the rotary direction of the jog dial 12 comes to agree with the movement in the direction of the y-coordinate. As a result, the coordinates moves in the direction of (01, 08)Z,900 (01, 09)Z,900 (01, 10)Z,900 (01, 11)Z,900 (01, 12).

In Step S23, the CPU 25 generates request-responding data and transmits it to the PC 50. The request-responding data generated in Step S22 describes the coordinates of the position that is located when the cursor is moved to the right from the current position in the data region for a position code, whereas NULL data is described in the data region for an ASCII code.

In Step S24, the CPU 25 determines if the jog dial 12 is depressed in a state where the character code "CR" is read out from the ROM 23 and a depressing operation signal is supplied from the jog dial controller 22 or not. If a depressing operation signal is supplied, it proceeds to Step S25. If, on the other hand, no depressing operation signal is supplied, it proceeds to Step S26.

In Step S25, the CPU 25 generates request-responding data and transmits it to the PC 50. The request-responding data generated in Step S25 describes the coordinates of the character code that is being read out to the CPU 25 in the data region for a position code, whereas the applicable ASCII code is described in the data region for an ASCII code. A completion flag "1" is raised at the leading bit (flag bit b7) of the fourth byte in the data region shown in FIG. 6 to notify that the password input operation is finished. When a character code other than "CR" is selected, no completion flag is raised but "0" is shown at the leading bit of the fourth byte in the request-responding data.

In Step S26, the CPU 25 determines if the jog dial 12 is depressed in a state where the character code "DELL" is read out from the ROM 23 and a depressing operation signal is supplied from the jog dial controller 22 or not. If a depressing operation signal is supplied, it proceeds to Step S27. If, on the other hand, no depressing operation signal is supplied, it proceeds to Step S29.

In Step S27, the CPU erases (clears) the data in the password register 26.

In Step S28, the CPU 25 generates request-responding data and transmits it to the PC 50. The request-responding data generated in Step S28 describes the coordinates of the character code that is being read out to the CPU 25 in the data region for a position code, whereas the applicable ASCII code is described in the data region for an ASCII code.

In Step S29, the CPU 25 determines if the jog dial 12 is depressed in a state where any of the character codes "0 through 9", "A through Z" and "a through z" is read out from the ROM 23 and a depressing operation signal is supplied from the jog dial controller 22 or not. If a depressing operation signal is supplied, it proceeds to Step S30. If, on the other hand, no depressing operation signal is supplied, it proceeds to Step S32.

In Step S30, the CPU 25 stores the read out character code in the password register 26.

In Step S31, the CPU 25 generates request-responding data and transmits it to the PC 50. The request-responding data generated in Step S31 describes the coordinates of the position from which the character code is being read to the CPU 25 in the data region for a position code, whereas NULL data is described in the data region for an ASCII code. As NULL data is described in the data region for an ASCII code of the request-responding data to be transmitted to the PC 50, the PC 50 is not notified of the character code selected for the password.

In Step S32, the CPU 25 determines if the jog dial 12 is depressed in a state where any of the character codes "+, −, =" is read out from the ROM 23 and a depressing operation signal is supplied from the jog dial controller 22 or not. If a depressing operation signal is supplied, it proceeds to Step S33. If, on the other hand, no depressing operation signal is supplied, it returns to Step S21.

In Step S33, the CPU 25 generates request-responding data and transmits it to the PC 50. The request-responding data generated in Step S31 describes the coordinates of the position from which the character code is being read to the CPU 25 in the data region for a position code, whereas NULL data is described in the data region for an ASCII code. As NULL data is described in the data region for an ASCII code of the request-responding data to be transmitted to the PC 50, the PC 50 is not notified of the character code selected for the password.

Figure 4:
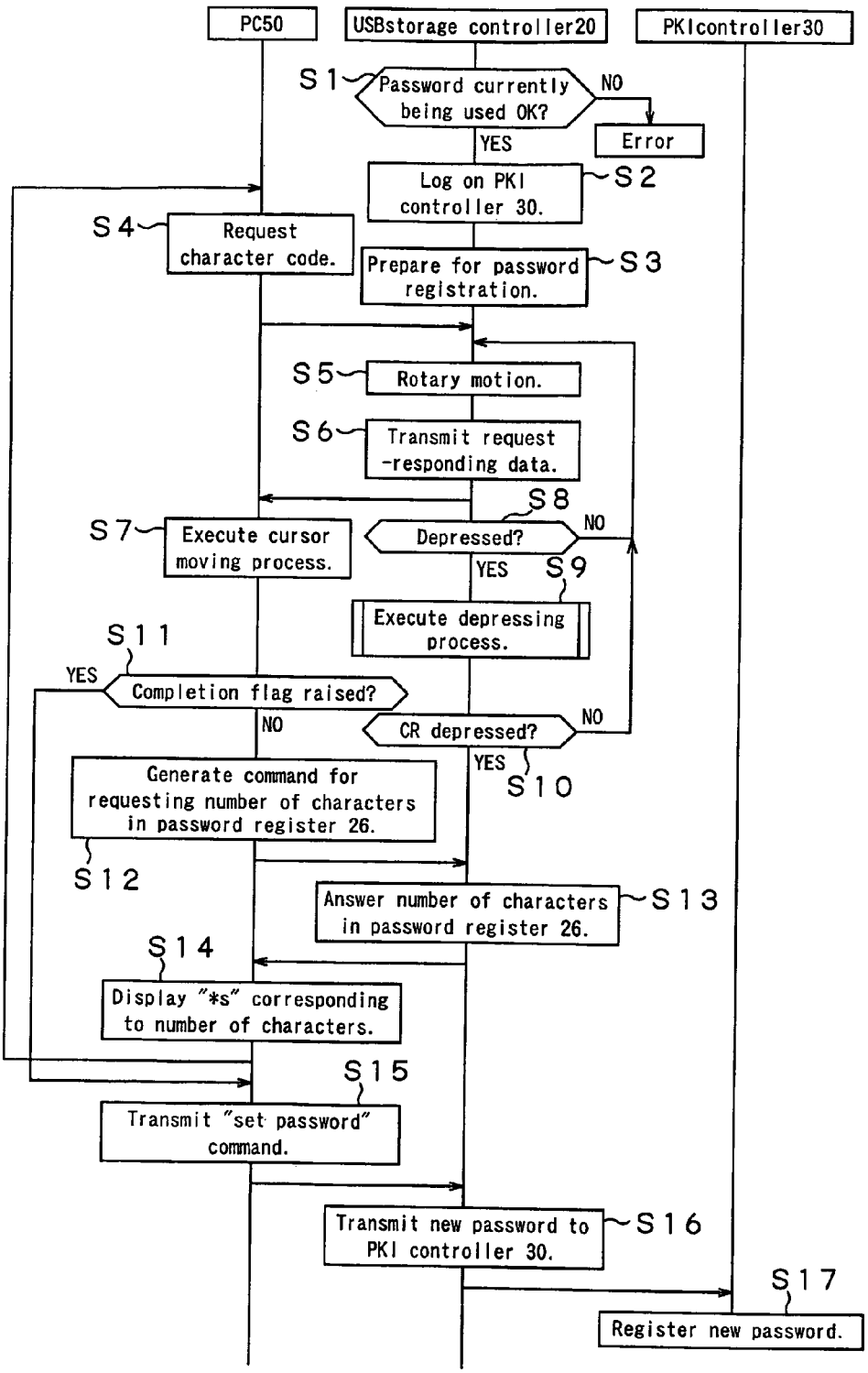
FIG. 4 is a flow chart of the operation of registering a password in the storage medium.

In this way, the operation of depressing the jog dial 12 in Step S9 of FIG. 4 is executed. Now, the description of the password registration process will be resumed by referring back to FIG. 4.

In Step S10, the CPU 25 determines if the jog dial 12 is depressed in a state where the character code "CR" is being read out and a depressing operation signal is supplied from the jog dial controller 22 in Step S24 or not. If the jog dial 12 is depressed and a depressing operation signal is supplied, it proceeds to Step S13. If, on the other hand, the jog dial 12 is not depressed and no depressing operation signal is supplied, it returns to Step S5.

In Step S11, the PC 50 determines if a completion flag is raised at the leading bit of the fourth byte in the request-responding data transmitted from the USB storage controller 20 of the storage medium 1 or not. It proceeds to Step S15 when a completion flag is raised, whereas it proceeds to Step S12 when no completion flag is raised.

In Step S12, the PC 50 transmits a number of characters requesting command for requesting notification of the number of characters of the password stored in the password register 26 to the USB storage controller 20 of the storage medium 1.

In Step S13, the CPU 25 counts the number of characters in the password register 26 and answers the PC 50.

In Step S14, the PC 50 displays "*s" as many as the number of characters in the password register 26 as notified from the CPU 25 in the new password input field 71b of the password input field 71 of the password input image 70 that is being displayed on the monitor 52. When the operation of Step S14 ends, the PC 50 returns to Step S4 and continues the character code selection process.

In Step S15, the PC 50 transmits a "set password" command to the PKI controller 30 so as to have the input password registered as new password in response to the completion flag raised in the request-responding data that is transmitted from the CPU 25. It may be so arranged as to have the input new password input once again at this time in order to check that the input password is correct before transmitting the "set password" command. Then, the password input field 71 in the password input image 70 illustrated in FIG. 5 may be made to include a new password input confirmation field 71c.

In Step S16, the USB storage controller 20 transmits the password stored in the password register to the PKI controller 30.

In Step S17, the PKI controller 30 registers the transmitted password as a new password for logging on the PKI controller 30.

While FIG. 4 illustrates the password registration process that is conducted at the time of logging on the PKI controller 30 and hence the password to be registered is transmitted to the PKI controller 30 in the above description, the password to be logged on the security area 40b of the flash memory 40 will be registered in the security area 40b.

<Password Authentication Process>

Figure 8:
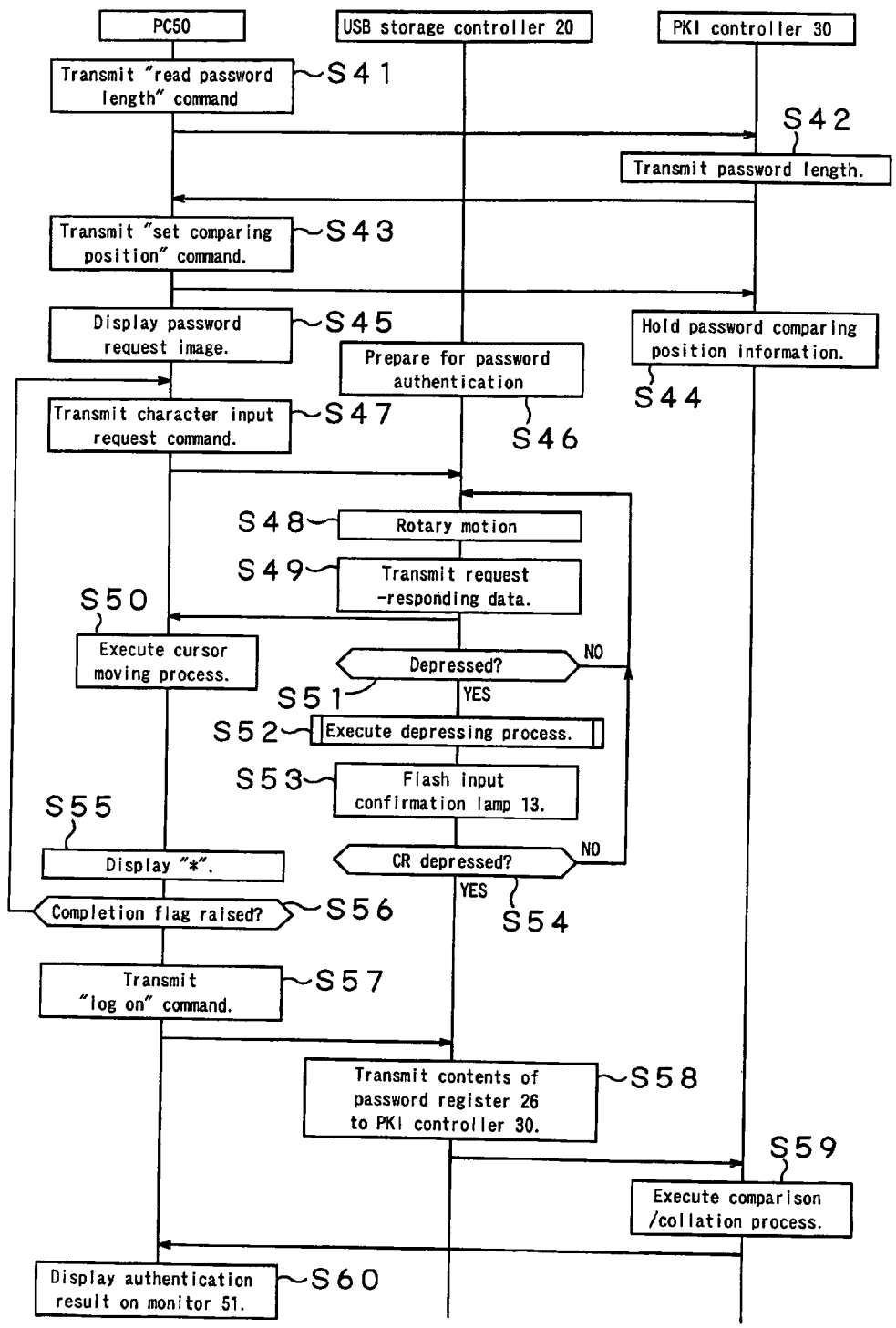
FIG. 8 is a flow chart of the operation that is carried out for authenticating a password by the storage medium.

Now, the password authentication process in the storage medium 1 will be described below by referring to the flow chart of FIG. 8.

In Step S41, the PC 50 generates a "read password length" command and transmits it to the PKI controller 30 by way of the USB storage controller 20 in order to acquire the password length (number) of the password registered in the PKI controller 30.

In Step S42, the CPU 36 of the PKI controller 30 transmits the password length of the registered password to the PC 50 by way of the USB storage controller 20.

In Step S43, the PC 50 transmits a "set comparing position" command to the PKI controller 30 by way of the USB storage controller 20. In the process of comparing the registered password at the time of logging on the PKI controller 30 in the storage medium 1, an authentication process is conducted without verifying that the registered password entirely agrees with the input password but by comparing only part of the registered password for agreement.

More specifically, the user is requested to input a string of consecutive characters that is part of the password but having a number of characters smaller than that of the password registered by the user. The degree of security may be lowered slightly when the number of characters to be compared and collated is reduced. However, since the number of characters that the user is requested to input is small, the load applied on the user is not significant if the number of words to be registered as password is increased to raise the degree of security. Thus, the net result will be a substantially same level of security.

Figures 9A, 9B:
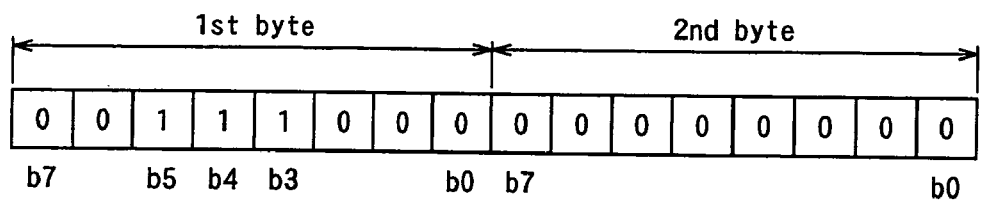
FIG. 9A is a schematic illustration of an exemplary password that can be used in the storage medium and FIG. 9B is a schematic illustration of the part of a registered password to be authenticated.

Now, assume that the password to be registered in the PKI controller 30 is a string of 16 characters and 16 bytes of "1234567890abcdef" as shown in FIG. 9A. Then, the "set comparing position" command that the PC 50 generates in Step S43 specifies the part of the character string to be compared. Thus, it is transmitted to the PKI controller 30 along with information on the password comparing position. The information on the password comparing position is information of 2 bytes (16 bits) typically as shown in FIG. 9B and the bits correspond to the respective digits of the password illustrated in FIG. 9A. In FIG. 9B, the digits at the positions of bit numbers b3, b4 and b5 of the first byte are "1"s and 3, 4 and 5 that respectively corresponds to them in FIG. 9A are used to form a string of consecutive characters to be compared with the password registered in the PKI controller 30. At least three consecutive characters are to be used for comparing with the registered password for the purpose of the present invention.

Referring to FIG. 9B, the bits to be used for selecting a string of consecutive characters are selected by means of random numbers generated by the PC 50 for each input password. In other words, the bit positions may differ each time of comparison.

In Step S44, the CPU 36 of the PKI controller 30 holds the information on the password comparing position transmitted to it.

Figure 10:
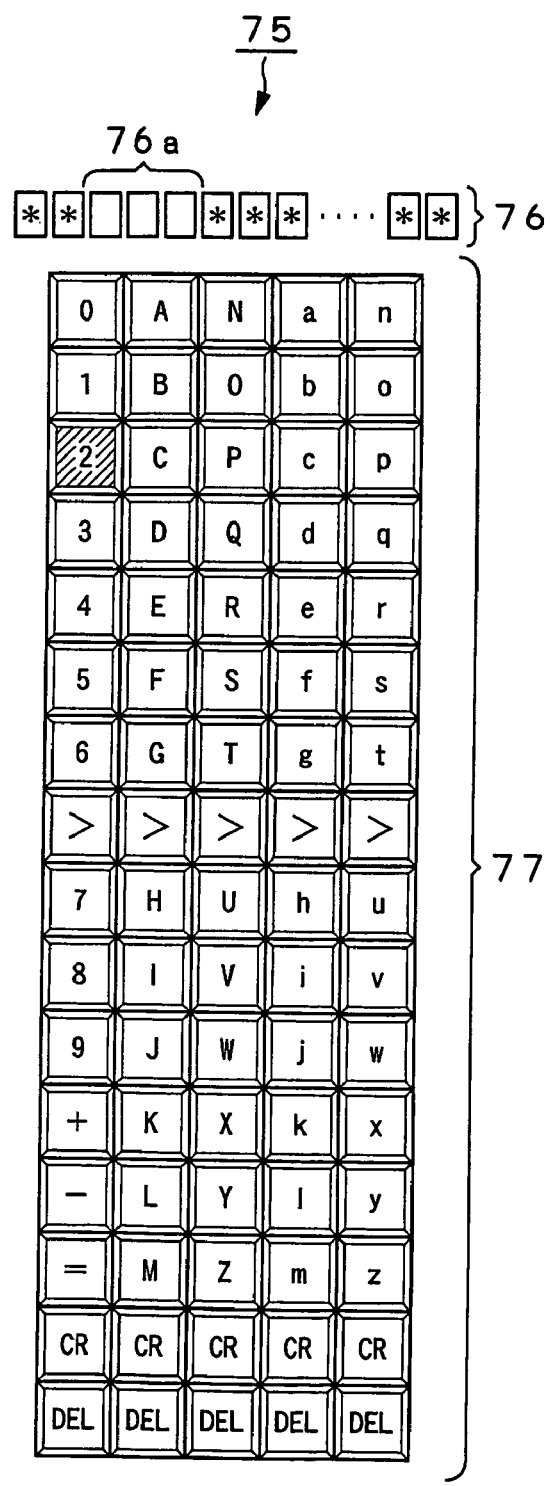
FIG. 10 is an exemplary image displayed on the monitor of a PC connected to the storage medium for authenticating a password.

In Step S45, the PC 50 displays a password request image on the monitor 52. FIG. 10 illustrates a typical password input image 75 that may be displayed on the monitor 52. As shown in FIG. 10, the displayed password input image 75 includes a password input field 76 and a password selection table 77.

The information on the password comparing position generated in Step S43 is reflected to the password input field 76. The positions requesting a string of consecutive characters to be input are blanks 76a, while the other positions requesting a password to be input are filled with "*"s so that the password input field 76 may appear as if a password is already input.

Note that the password selection table 77 shown in FIG. 10 is identical with the password selection table 72 of FIG. 5. Therefore, the PC 50 holds this password selection table 77.

In Step S46, the CPU 25 prepares for authenticating a password. More specifically, the CPU 25 erases (clears) the contents of the password register 26. On the other hand, the PC 50 displays a cursor at the upper left corner of the password selection table 77 illustrated in FIG. 10, or at the position of numeral "0", on the monitor 52.

In Step S47, the PC 50 requests a character code to be input from the USB storage controller 20 of the storage medium 1. As shown in FIG. 8, the PC 50 repeats the request for a character code periodically.

In Step S48, the user operates the jog dial 12 and rotates it to select a character code from the password selection table 77. As the jog dial 12 is operated and rotated, a rotary operation signal is supplied from the jog dial controller 22 to the CPU 25. The CPU 25 reads out the character code from the password conversion table 60 stored in the ROM 23 according to the supplied rotary operation signal.

In Step S49, the CPU 25 generates request-responding data in response to the request of the PC 50 for a character code and transmits it to the PC 50. Since the structure of the request-responding data is already described above by referring to FIG. 6, it will not be described here any further.

In Step S50, the PC 50 detects the position code in the transmitted request-responding data and moves the cursor on the password selection table 77.

If the jog dial 12 is depressed in Step S51, the process proceeds to Step S52. If, on the other hand, the jog dial 12 is not depressed, the process returns to Step S48 to continue the rotary operation of the jog dial 12 for selecting a desired character code.

In Step S52, the user who selected the desired character code by the rotary operation depresses the jog dial 12. As the jog dial 12 is depressed, a depressing operation signal is supplied from the jog dial controller 22 to the CPU 25. The CPU 25 transmits request-responding data to the PC 50 in response to the supply of the depressing operation signal. The request-responding data transmitted to the PC 50 in Step S52 varies depending on the type of the selected character code. Since the operation of Step S52 is same and identical with the operation described above by referring to FIG. 7, it will not be described here any further.

In Step S53, the CPU 25 detects the number of characters of the password stored in the password register 26 and flashes the input confirmation lamp 13 depending on the number of characters. More specifically, it flashes the input confirmation lamp 13 consecutively for the number of times equal to the number of characters it detects and repeats the flashing operation intermittently every time t, for example.

Figure 2:
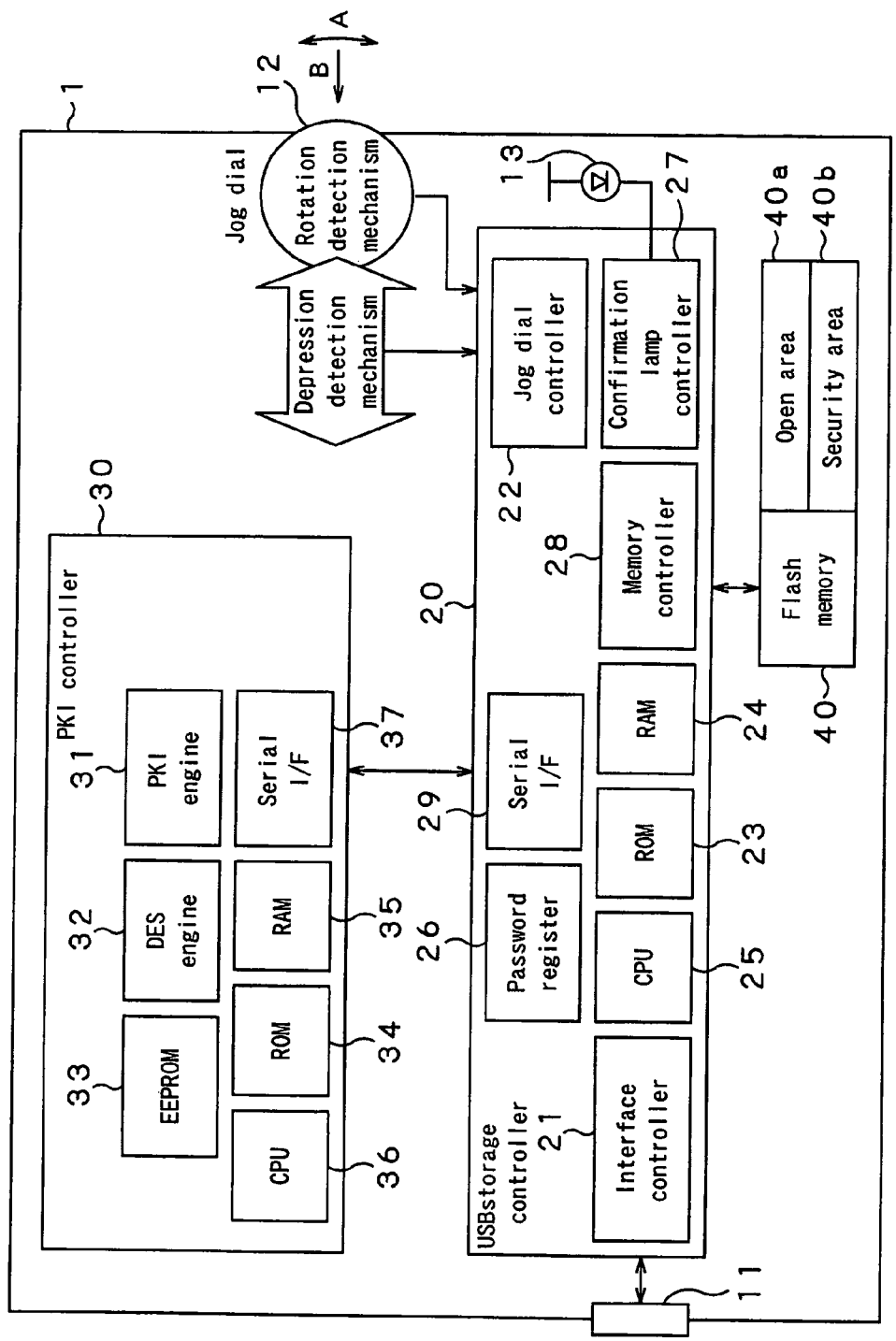
FIG. 2 is a schematic block diagram of the storage medium, illustrating the configuration thereof.
Figure 11:
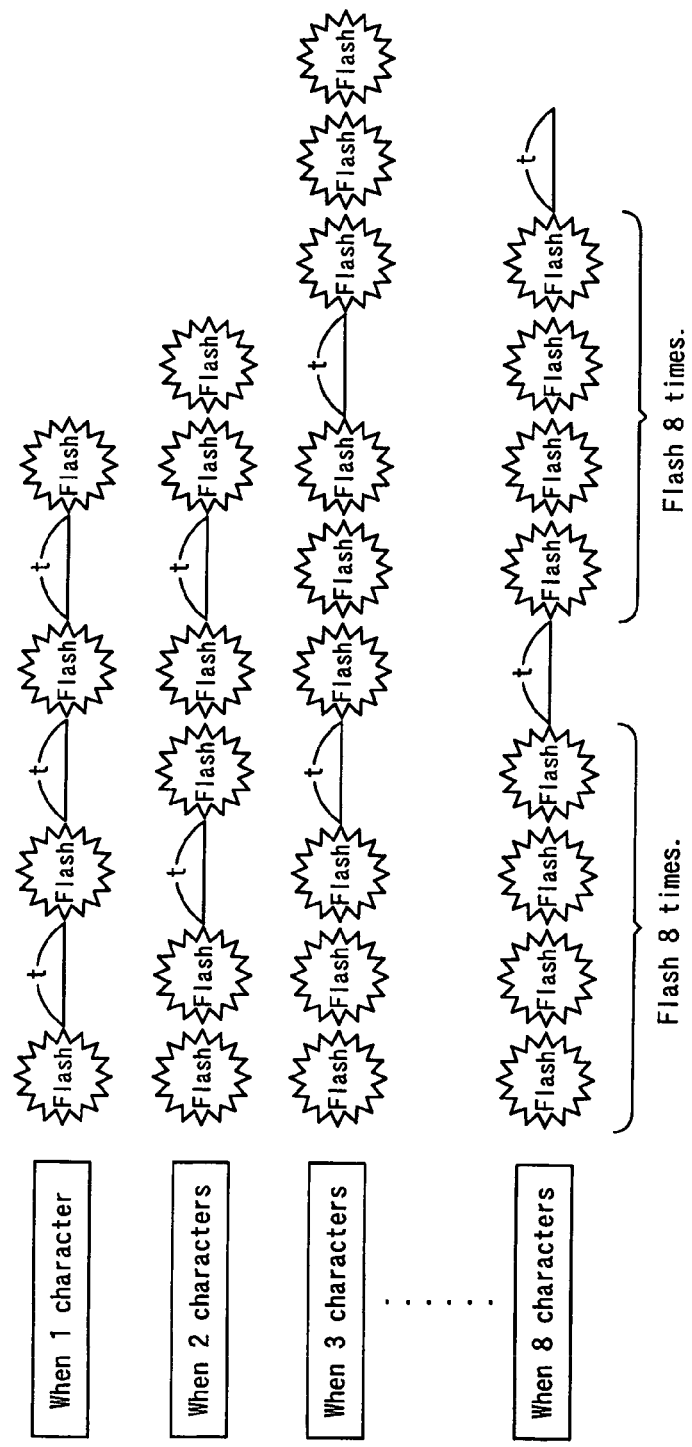
FIG. 11 is a schematic illustration of a technique for notifying the number of passwords that have been input by the current stage of operation in the password authentication process.

The confirmation lamp controller 27 and the input confirmation lamp 13 of the storage medium 1 shown in FIG. 2 may be replaced by oscillators. Then, the flashing operation as illustrated in FIG. 11 is replaced by an oscillating operation. Then, oscillations of a short period of time are produced consecutively for the number of times equal to the number of characters of the password stored in the password register 26 and the consecutive short oscillations are repeated after the elapse of time t.

As a result, the user can visually or bodily realize the number of words of the password stored in the password register 26. Thus, the user can do without giving any persons near him or her a clue for knowing the password when inputting the password.

In Step S54, the CPU 25 determines if the jog dial 12 is depressed in a state where the character code "CR" is read out from the ROM 23 and a depressing operation signal is supplied from the jog dial controller 22 or not. If the jog dial 12 is depressed and a depressing operation signal is supplied, it proceeds to Step S58. If, on the other hand, the jog dial 12 is not depressed and no depressing operation signal is supplied, it returns to Step S48.

In Step S55, it may be so arranged that the PC 50 displays "*"s in the blank positions 76a of the password input field 76 in response to the requested input of a string of characters. It may alternatively be so arranged that the PC 50 does not display "*"s from the security point of view.

In Step S56, the PC 50 determines if a completion flag is raised at the leading bit of the fourth byte in the request-responding data transmitted from the USB storage controller 20 of the storage medium 1 or not. It proceeds to Step S57 when a completion flag is raised, whereas it returns to Step S47 when no completion flag is raised. While a completion flag is raised when "CR" is selected in the process of depressing operation in Step S52 in the above description, it may alternatively be so arranged that a completion flag is automatically added when characters are stored in the password register 26 by the requested number.

In Step S57, the PC 50 transmits a "log on" command to the USB storage controller 20 in order to transmit the character string of the password input from the jog dial 12 to the PKI controller 30.

In Step S58, the CPU 25 of the USB storage controller 20 transmits the requested character string of the password stored in the password register 26 to the PKI controller 30 along with the "log on" command in response to the "log on" command transmitted from the PC 50.

In Step S59, the CPU 36 of the PKI controller 30 reads out the character string to be compared and collated with the password that is registered in advance, referring to the information on the password comparing position stored in Step S44. Then, it compares and collates the read out character string with the character string transmitted from the USB storage controller 20 and executes an authentication process. The CPU 36 transmits the outcome of the authentication process to the PC 50 by way of the USB storage controller 20.

In Step S60, the PC 50 displays the outcome of the authentication process transmitted from the PKI controller 30 on the monitor 52.

While the characters in a string to be used for authenticating a password are consecutive characters in the above description, it is not necessary to use consecutive characters. In other words, characters that are selected randomly and not arranged consecutively on a password may alternatively be used for the purpose of authentication.

Note that a password authentication process that is executed at the time of logging on the PKI controller 30 is described above by referring to FIG. 8. In other words, the authentication process is executed by the PKI controller 30. However, it will be appreciated that a password authentication process is executed by the USB controller 20 when logging on the security area 40*b* of the flash memory 40.

[Second Embodiment]

Now, the second embodiment of the present invention, which is a storage medium 2, will be described below by referring to FIG. 12. The storage medium 2 is an information storage apparatus realized by adding a function of being able to automatically relog in from a logged off state if the log off takes place within a predetermined period of time after a first log in to the storage medium 1 of the first embodiment.

Generally, when the storage medium 1 of the first embodiment is connected to the PC 50 for use to log in the PKI controller 30 of the storage medium 1 and, for example, the storage medium 1 is not operated for a predetermined period of time thereafter, while the screen saver is automatically started because the PC 50 is not operated for a predetermined period of time, the system is automatically logged off when the storage medium 1 is pulled out from the PC 50.

For instance, if the user leaves the PC 50 for a short time, it is desirable for the user to pull out the storage medium 1 from the PC 50 and takes it with him or her for the purpose of security. However, when the user connects the storage medium 1 to the PC 50 and uses the PKI controller 30 again, the storage medium 1 will require the user to input the password by means of the jog dial 12. If the PC 50 is not used for a predetermined period of time and the system is automatically logged off, the storage medium 1 will also request the user to input the password by means of the jog dial 12. The operation of inputting the password is a very cumbersome operation to the user and, if a situation where the user has to leave the PC 50 or does not use the PC 50 for a predetermined period of time occurs frequently, the arrangement of requesting the user to input the password each time is not realistic.

Figure 12:
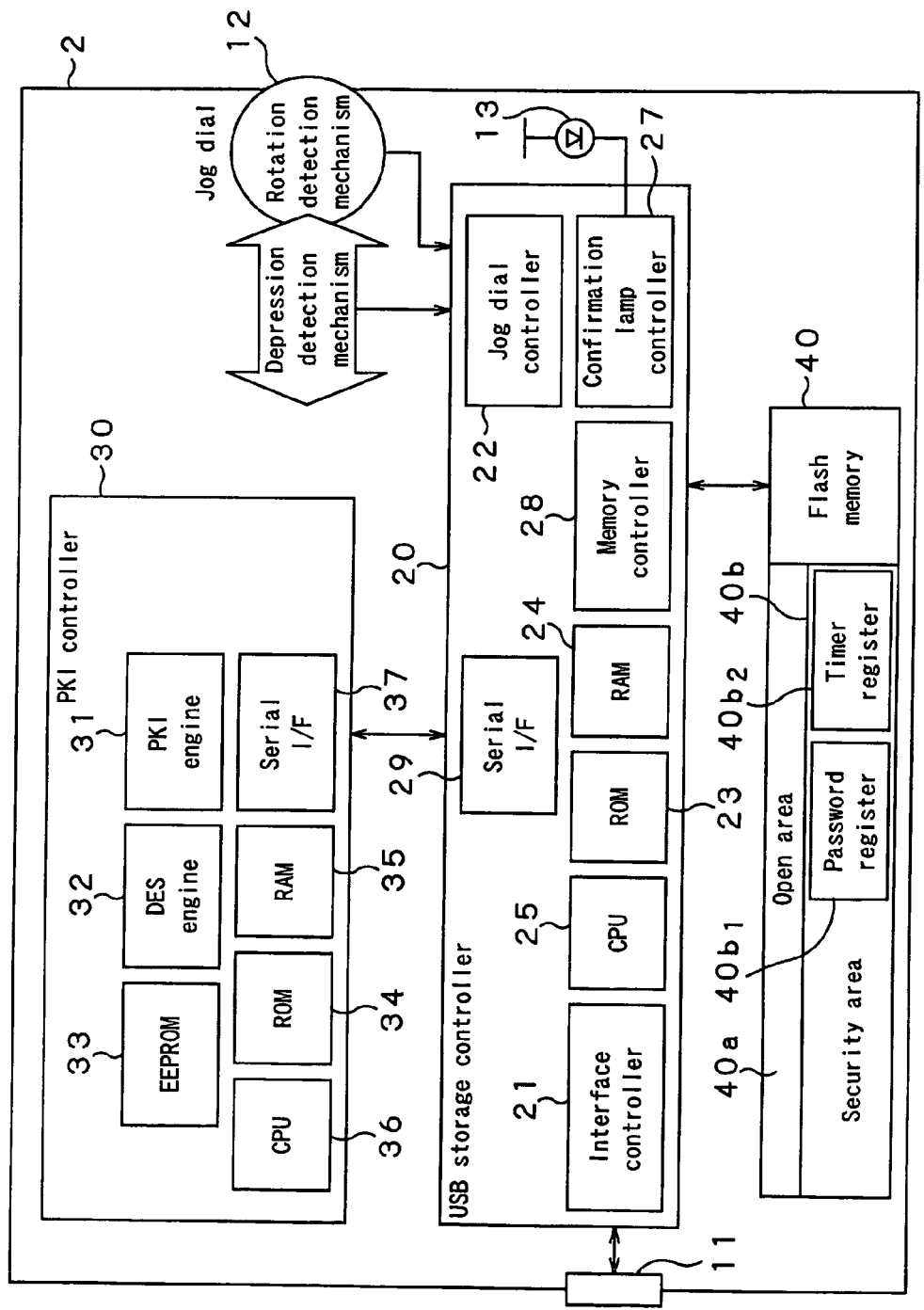
FIG. 12 is a schematic block diagram of a storage medium, which is the second embodiment of the present invention, illustrating the configuration thereof.

To dissolve such a problem, the flash memory 40 of the storage medium 2 of FIG. 12 includes a password register 40*b*1, which replaces the password register 26 of the storage medium 1, and a timer register 40*b*2. Otherwise, the storage medium 2 of this embodiment has a configuration same as that of the storage medium 1 of the first embodiment. Therefore, the components of the storage medium 2 that are same as those of the storage medium 1 are denoted respectively by the same reference symbols and will not be described any further.

Figure 13:
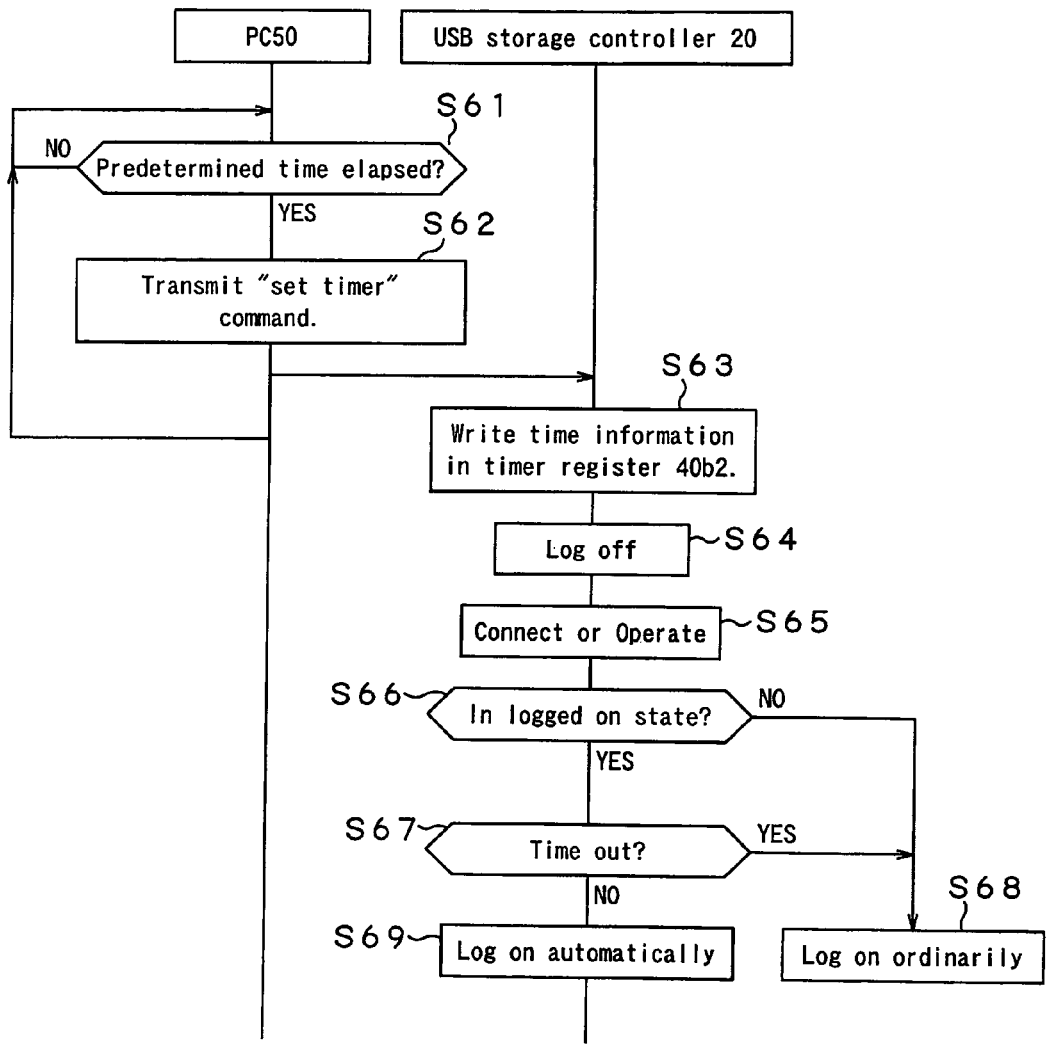
FIG. 13 is a flow chart of the operation of automatic log on of the storage medium.

Now, the operation of automatically logging in system, using the storage medium 2, will be described by referring to the flow chart of FIG. 13. Assume here that the storage medium 2 is already connected to the PC 50 and the system is logged in already so that it is possible to access the PKI controller 30 at any time.

In Step S61, the PC 50 determines if a predetermined period of time, e.g., 1 minute, has elapsed as counted by its own timer or not. If the predetermined period of time has elapsed, the operation proceeds to Step S62. If, on the other hand, the predetermined period of time has not elapsed yet, the operation returns to Step S61 to wait until the elapse of the predetermined period of time.

In Step S62, the PC 50 transmits time information on the time as counted by the timer to the USB storage controller 20 of the storage medium 2 along with a "set timer" command.

In Step S63, the CPU 25 of the USB storage controller 20 writes the transmitted time information to the timer register 40*b*2 of the flash memory 40 in response to the "set timer" command.

The Steps S61 through S63 are executed repeatedly as long as the storage medium 2 is connected to the PC 50.

Assume that the logged in state of the system changes and the system is logged off for some reason or another in Step S64. The storage medium 2 may be intentionally pulled off or the screen saver may be automatically started to log off the system.

If the storage medium 2 is pulled off, it is connected to the PC 50 once again so as to be supplied with power in Step S65. If the screen saver is automatically started, the storage medium 2 is operated in Step S65 to bring it into a standby state for logging in.

In Step S66, the CPU 25 determines if the system is in a logged on state immediately before the operation of Step S65 or not. If the system is in a logged on state, the operation proceeds to Step S67. If, on the other hand, the system is not in a logged on state, the operation proceeds to Step S68. More specifically, the CPU 25 determines if the system is in a logged on state or not by referring to the log on history.

In Step S67, the CPU 25 reads out the time information written to the timer register 40*b*2 and compares it with the current time information supplied from the PC 50 to determine if the time difference exceeds a predefined time allowance (e.g., 1 hour) (time out) or not because the system is in a logged on state immediately before the operation of Step S65 and it is possible to access the security area 40*b* of the flash memory 40. If it is time out, the operation proceeds to Step S68. If, on the other hand, the time difference is still within the predefined time allowance, the operation proceeds to Step S69.

In Step S68, it is possible to log on the system only manually, using the jog dial 12, because the system does not allow to be automatically logged in. The password input by means of the jog dial 12 is stored in the password register 40*b*1 arranged in the security area 40*b* of the flash memory 40.

In Step S69, the CPU 25 automatically logs on the PKI controller 30, using the password stored in the password register 40*b*1 arranged in the security area 40*b* of the flash memory 40.

Thus, if the system is forcibly logged off and the logged off time is only short, it is possible to automatically log on the system in the above described manner. Therefore, the user can avoid a cumbersome operation of inputting a password to a greater convenience on the part of the user. Accordingly, the user will willingly pull out the storage medium 2 from the PC 50 when he or she leaves the PC 50. Thus, the risk that the storage medium 2 is used by the third party without authorization is reliably avoided.

The automatic log in feature of the storage medium 2 of the second embodiment may not necessarily be realized by an input mechanism such as jog dial 12. In other words, a generally acceptable USB token may alternatively be used for the purpose of the present invention.

[Third Embodiment]

The storage mediums 1 and 2 of the first and second embodiments of the invention are provided with a jog dial 12 that operates as a password input means and is adapted to be rotated and depressed. The storage medium 3 of the third embodiment of the invention as illustrated in FIG. 14 is provided with a multi-switch 14 in place of the jog dial 12.

Figure 15:
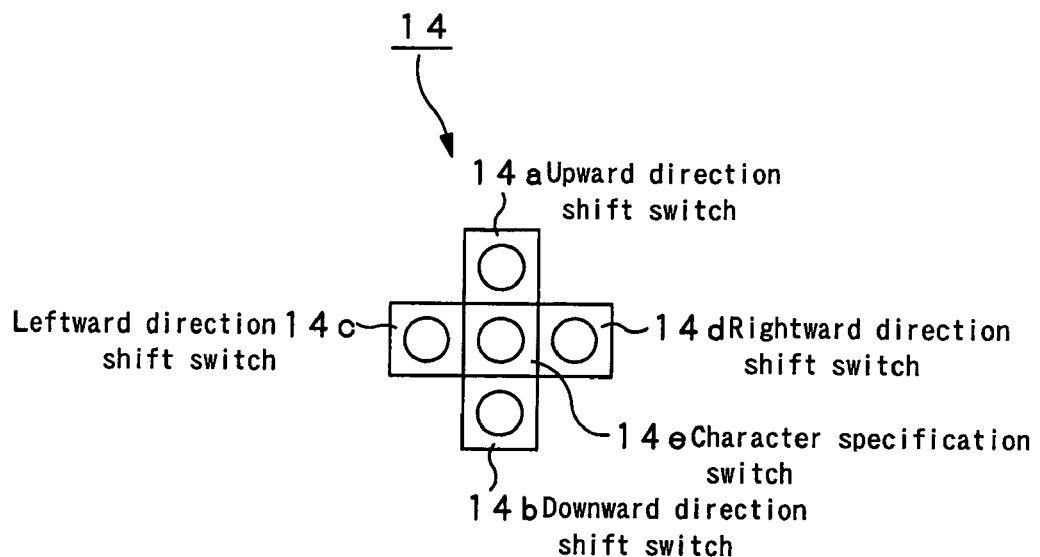
FIG. 15 is a schematic illustration of the multi-switch of the storage medium.

As shown in FIG. 15, a multi-switch 14 has an upward direction shift switch 14a, a downward direction shift switch 14b, a leftward direction shift switch 14c and a rightward direction shift switch 14d for specifying a moving direction, which may be upward, downward, leftward or rightward, along with a character specification switch 14e for finalizing the selected character, which operates like the depressing operation of the jog dial 12. Such a multi-switch 14 provides an advantage of easiness with which the user can move to any of the adjacently located characters when selecting a character and finalizing the selection of the character in the operation of inputting a password, using the password conversion table 60 and the password selection tables 72, 77, if compared with a jog dial 12. Additionally, the use of the function code ">" that is provided in each of the tables is no longer necessary when such a multi-switch 14 is provided.

Figure 14:
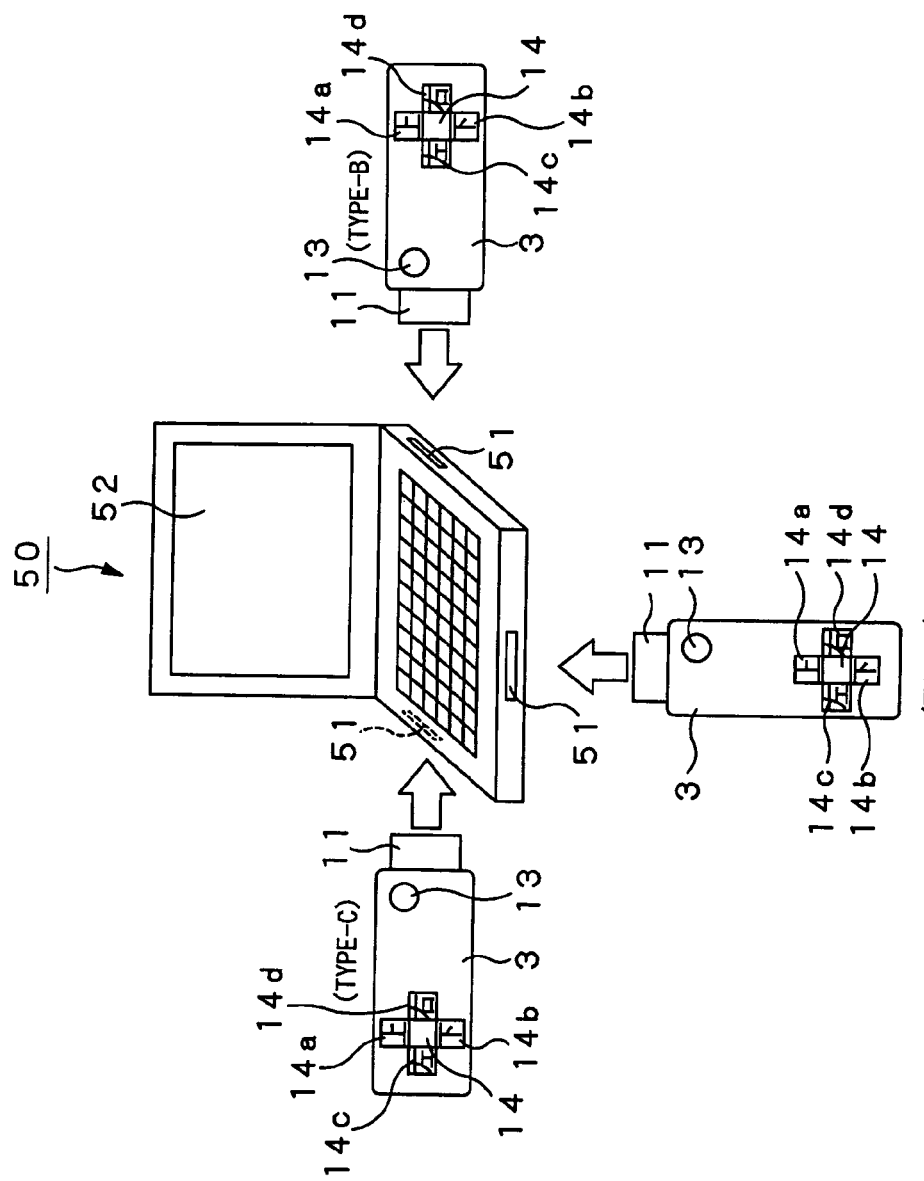
FIG. 14 is a schematic illustration of a mode of utilization of a storage medium, which is the third embodiment of the present invention.

As shown in FIG. 14, the position where the USB jack 51 is arranged in the PC 50 may vary depending on the type of PC. Therefore, the user will feel it very convenient if moving directions can be assigned arbitrarily to the four direction shift switches of the multi-switch 14 that the storage medium 3 has as shown in FIG. 14. For example, when the storage medium 3 is connected to the PC 50, the PC 50 specifies one of "TYPE-A", where the direction shift switch located close to the USB jack 11 operates as upward direction shift switch 14a, "TYPE-B", where the direction shift switch located close to the USB jack 11 operates as leftward direction shift switch 14c and "TYPE-C", where the direction shift switch located close to the USB jack 11 operates as rightward direction shift switch 14d.

For example, the PC 50 transmits a "set function key" command for specifying "TYPE-A", "TYPE-B" or "TYPE-C" to the USB storage controller 20. Then, the USB storage controller 20 sets the multi-switch 14 to "TYPE-A", "TYPE-B" or "TYPE-C", whichever appropriate, according to the "set function key" command.

Note that the direction shift switches of the multi-switch 14 may not necessarily be four switches including an upward direction shift switch, a downward direction shift switch, a leftward direction shift switch and a rightward direction shift switch as described above. For example, the multi-switch 14 may include four more direction shift switches in addition to the four direction shift switches including upward, downward, leftward and rightward direction switches to make the total number of direction shift switches equal to eight. In short, the present invention is by no means limited in terms of the number of direction shift switches.

[Fourth Embodiment]

Now, the storage medium of the fourth embodiment of the present invention will be described below.

Figure 16:
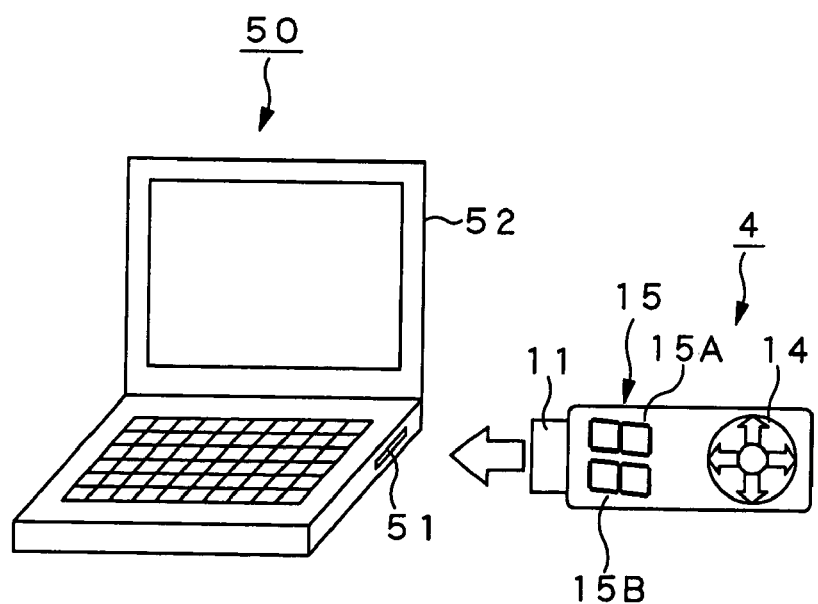
FIG. 16 is a schematic illustration of a mode of utilization of a storage medium, which is the fourth embodiment of the present invention.

As shown in FIG. 16, the storage medium 4 includes a multi-switch 14 and a display section 15 where the characters selected by means of the multi-switch 14 are displayed.

The configuration of the storage medium 4 will be described by referring to FIG. 17. The components same as or similar to those of the storage mediums 1 through 3 are denoted respectively by the same reference symbols and will not be described any further.

Figure 17:
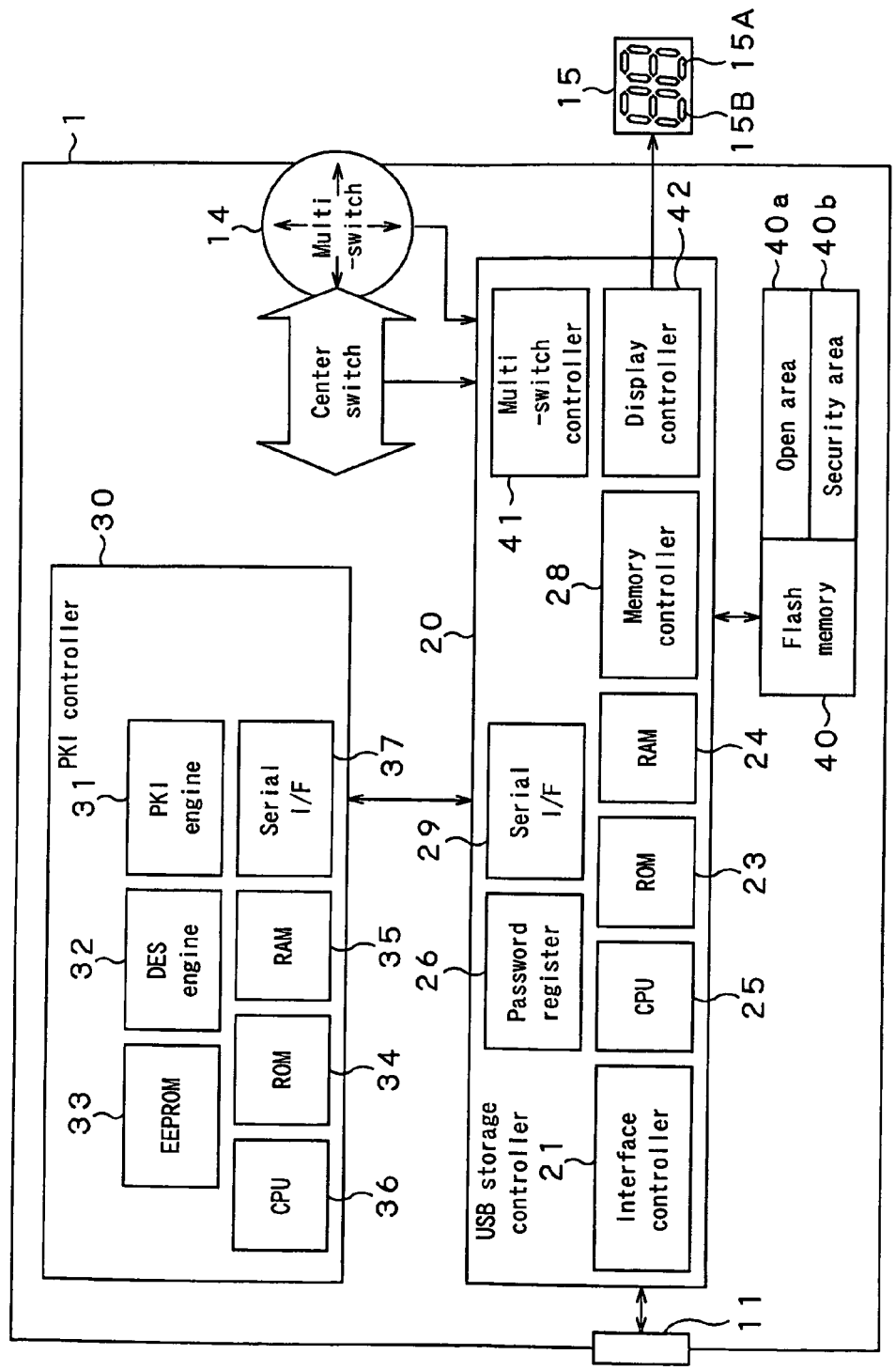
FIG. 17 is a schematic block diagram of the storage medium, illustrating the configuration thereof.

As shown in FIG. 17, the storage medium 4 includes a USB plug 11, a multi-switch 14, a display section 15, a USB storage controller 20, a PKI controller 30 and flash memory 40.

The display section 15 is a 7 segments type display section (2 digits) adapted to display the characters selected by means of the multi-switch 14. The display section 15 may alternatively have display regions for two digits or more than two digits or may be a liquid crystal display section that utilizes a display system other than a segment system. In short, any display means may be used for this storage medium 4 so long as it can display the characters selected by means of the multi-switch 14 regardless of the format and the mode of display.

The USB controller 20 includes an interface controller 21, a ROM 23, a RAM 24, a CPU 25, a password register 26, a memory controller 28, a serial I/F 29, a multi-switch controller 41 and a display controller 42.

The multi-switch controller 41 detects the signal output in response to an operation of the multi-switch 14 and generates a predetermined operation signal. The multi-switch controller 41 supplies the predetermined operation signal it generates to the CPU 25.

Figure 18:
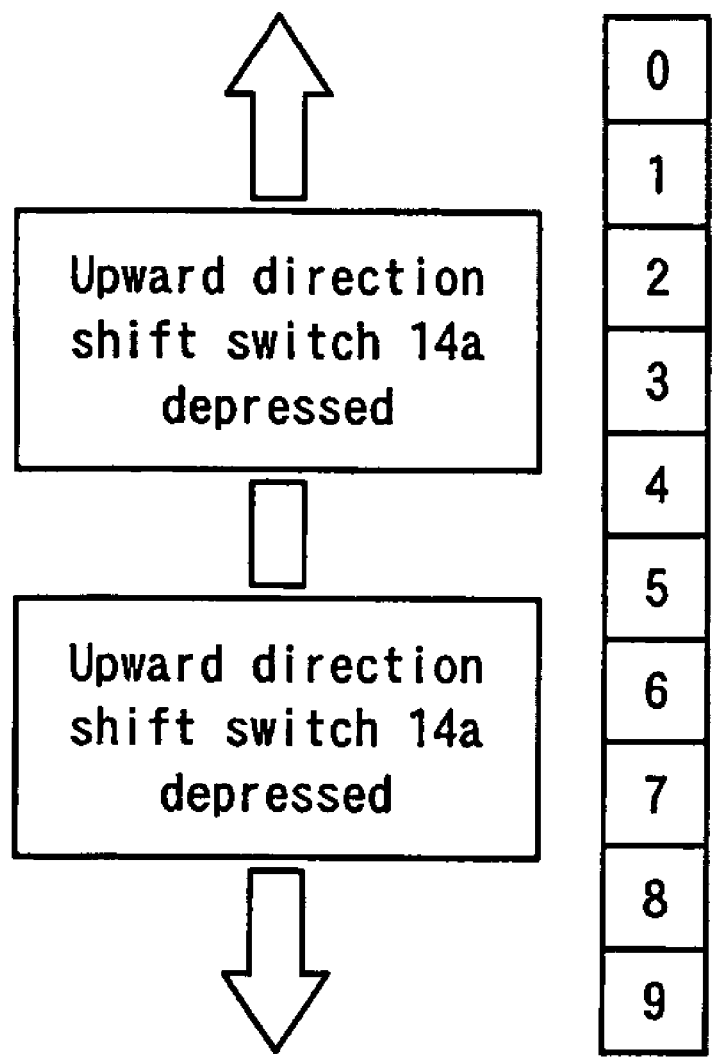
FIG. 18 is a schematic illustration of the password conversion table stored in the storage medium.

The CPU 25 reads out a character code from the one-dimensional password conversion table 43 stored in the ROM 23 as shown in FIG. 18 in response to the operation signal supplied from the multi-switch controller 41. The CPU 25 then transmits the position in the password conversion table 43 of the character code it reads out to the display controller 42 as positional information. The one-dimensional password conversion table contains character codes of "0, 1, 2, . . . 9" that are registered in it one-dimensionally so that an appropriate character code is selected as the upward direction shift switch 14a and/or the downward direction shift switch 14b are operated for the selection. The password conversion table may contain character codes other than numerals if they are registered in it. Additionally, the password conversion table may not necessarily be a one-dimensional table. It may alternatively be a two-dimensional password conversion table 60 as shown in FIG. 3.

The CPU 25 finalizes the character code it reads out from the password conversion table 43 stored in the ROM 23 in response to the operation signal supplied from the multi-switch controller 41 as a component of a character string. The information that the character code read out by the CPU 25 is finalized as a component of the character string of the password in response to the operation signal is not transmitted to the outside of the storage medium 4, or the PC 50.

The display controller 42 controls the display section 15 according to the positional information supplied from the CPU 25 and has the display section 15 display a predetermined character code.

The display controller 42 typically is adapted to display the selected character code on the right display region 15A of the display section 15 in an operation interlocked with the operation of the multi-switch 42 and also display information on the number of the digits that have already been input in the left display region 15B of the display section 15.

Figure 19A:
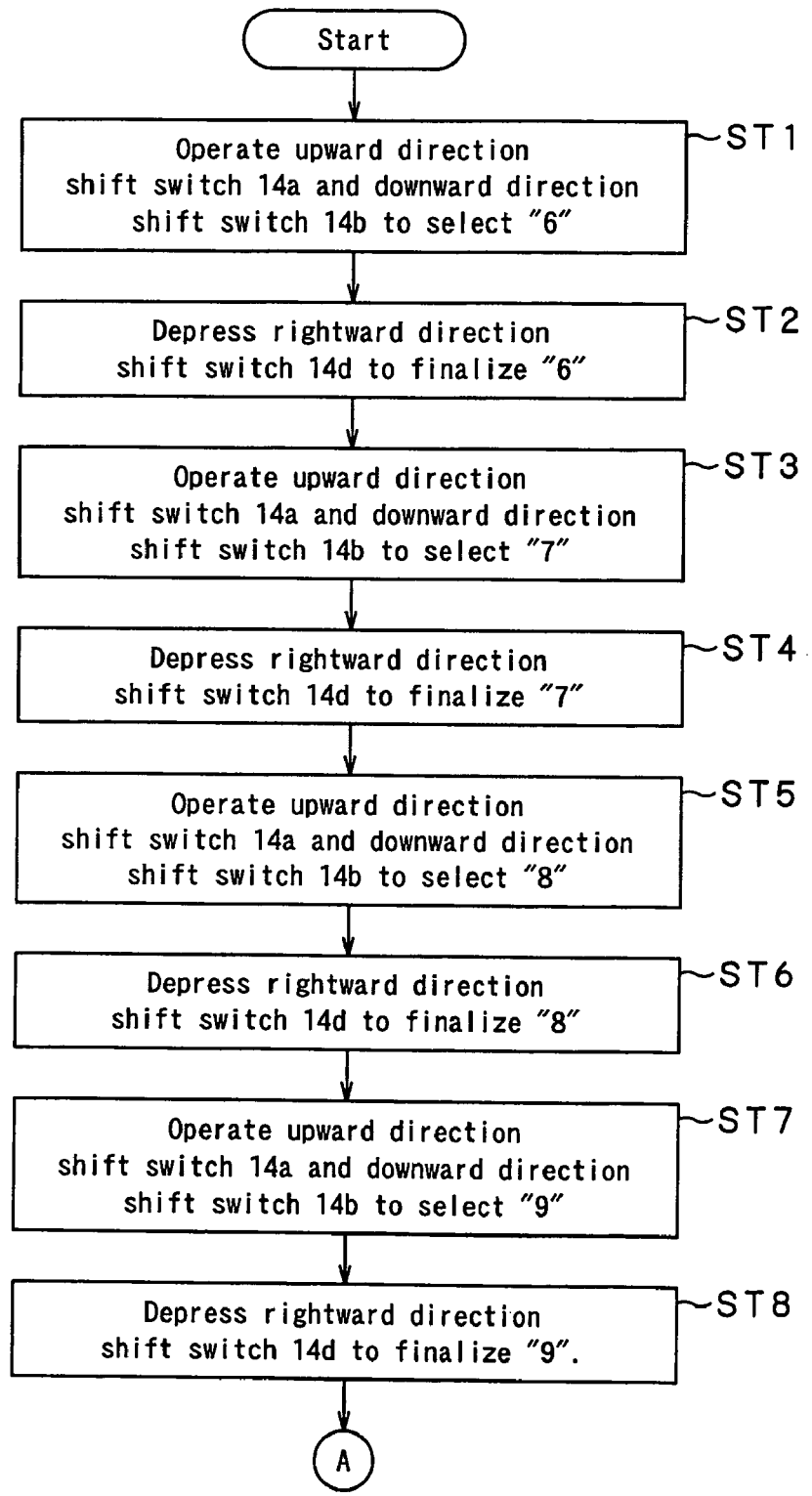
FIG. 19A is the first part of a flow chart of the operation of authenticating a password by the storage medium and FIG. 19B is a second part of the flow chart of the operation of authenticating a password by the storage medium.
Figure 19B:
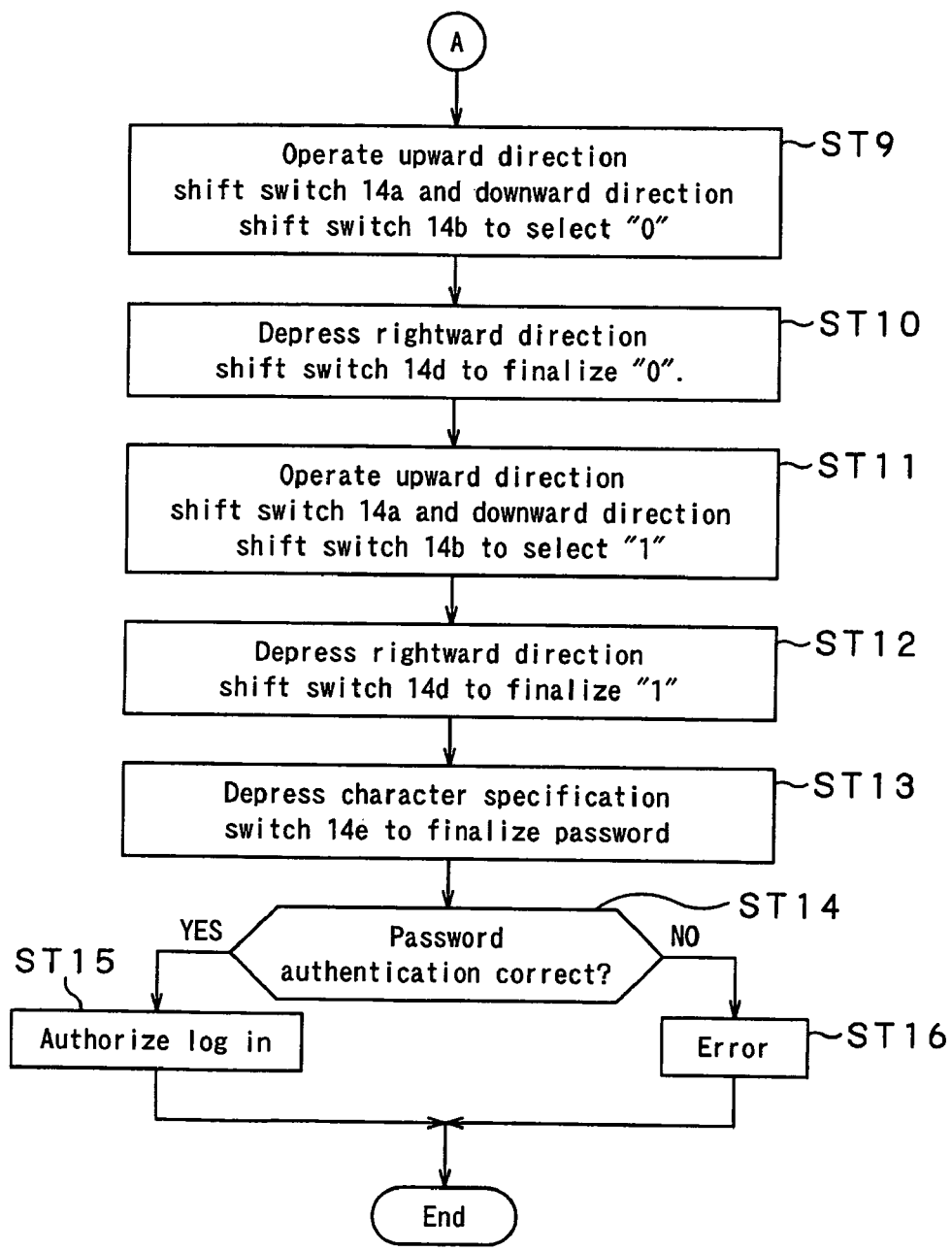

Now, the password authentication process of the storage medium 4 will be described below by referring to the flow chart of FIG. 19. In the following description, it is assumed that password "678901" is already registered as password for accessing the security area 40b. It may be so arranged that a password is registered by operating only the PC 50 or alternatively by operating only the storage medium 4.

Power is supplied to the storage medium 4 to make it ready for use when the USB jack 11 is connected to the PC 50. Then, the display section 15 is activated. At this time, typically "00" may be displayed in the display section 15.

Then, the user selects "6" by operating the upward direction shift switch 14a and the downward direction shift switch 14b of the multi-switch 14, while looking at the display section 15 (Step ST1).

As "6" is displayed in the right display region 15A of the display section 15, the user depresses the rightward direction shift switch 14d (Step ST2). Note that the upward direction shift switch 14a and the downward direction shift switch 14b of the multi-switch 14 are used to select a character code for a password and the right direction shift switch 14d is used to finalize the selection of a character code while the left direction shift switch 14c is used to clear a password and the character specification switch 14e is used to confirm a password in this embodiment. However, it may alternatively be so arranged that the user assigns functions to the switches of the multi-switch 14.

The multi-switch 14 generates a signal indicating that the right direction shift switch 14d is depressed and supplies the signal it generates to the USB storage controller 20 (multi-switch controller 41). As the USB storage controller 20 receives the signal indicating that the right direction shift switch 14d is depressed, it stores the character code "6" that is being displayed in the right display region 15A of the display section 15 in the password register 26 and then turns the right display region 15A into a blank, while displaying "1" in the left display region 15B. At this time, for example, the display section 15 may display a character code of "1_" (in the left display region 15B and the right display region 15A).

Then, the user selects "7" by operating the upward direction shift switch 14a and the downward direction shift switch 14b of the multi-switch 14, while looking at the display section 15 (Step ST3). As "7" is displayed in the right display region 15A of the display section 15, the user depresses the rightward direction shift switch 14d (Step ST4). At this time, for example, the display section 15 may display a character code of "2_".

Subsequently, the user selects "8" by operating the upward direction shift switch 14a and the downward direction shift switch 14b of the multi-switch 14, while looking at the display section 15 (Step ST5). As "8" is displayed in the right display region 15A of the display section 15, the user depresses the rightward direction shift switch 14d (Step ST6). At this time, for example, the display section 15 may display a character code of "3_".

Thereafter, the user selects "9" by operating the upward direction shift switch 14a and the downward direction shift switch 14b of the multi-switch 14, while looking at the display section 15 (Step ST7). As "9" is displayed in the right display region 15A of the display section 15, the user depresses the rightward direction shift switch 14d (Step ST8). At this time, for example, the display section 15 may display a character code of "4_".

Then, the user selects "0" by operating the upward direction shift switch 14a and the downward direction shift switch 14b of the multi-switch 14, while looking at the display section 15 (Step ST9). As "0" is displayed in the right display region 15A of the display section 15, the user depresses the rightward direction shift switch 14d (Step ST10). At this time, for example, the display section 15 may display a character code of "5_".

Thereafter, the user selects "1" by operating the upward direction shift switch 14a and the downward direction shift switch 14b of the multi-switch 14, while looking at the display section 15 (Step ST11). As "1" is displayed in the right display region 15A of the display section 15, the user depresses the rightward direction shift switch 14d (Step ST12). Then, for example, the display section 15 may display a character code of "6_".

Then, the user depresses the character specification switch 14e of the multi-switch 14 (Step ST13). In response to the operation of this step, the USB storage controller 20 transmits the password of "678901" stored in the password register 26 to the PKI controller 30. Then, the PKI controller 30 executes an authentication process of checking if the password of "678901" supplied from the USB storage controller 20 is correct or not (Step ST14). If the PKI controller 30 authenticates the supplied password as correct password (YES), it permits the user to log in the security area 40b (Step ST15).

Then, as a result of the permission by the PKI controller 30, the user can access the security area 40b.

If, on the other hand, the PKI controller 30 does not authenticate the supplied password because it is not a correct password (NO), the process ends up with error (Step ST16). It may be so arranged that, when the error is repeated for a predetermined number of times, it is not possible to log on the PKI controller if the right password is input thereafter. With this arrangement, it is no longer possible for the user to access the security area 40b.

When the storage medium 4 includes a display section 15 as described above, it is possible to carry out the operation of authenticating and confirming the input password only in the storage medium 4. Then, the operation of inputting the password does not require the use of any resource on the part of the PC 50 and hence no information on the password is written in the PC 50. Thus, if the PC 50 is stolen and the memories contained in the inside are analyzed for fraudulent purposes, the password would never be stolen so that it is possible to realize an enhanced level of security for the security area 40b of the flash memory 40.

Additionally, the operation of authenticating and registering the password can be completed only when power is supplied to the storage medium 4 of this embodiment from the PC 50. In other words, the operation of authenticating and registering the password does not depend on the OS installed in the PC 50.

Meanwhile, each of the above described storage mediums 1, 2, 3 and 4 of the first, second, third and fourth embodiments includes a password conversion table 60 stored in the ROM 23 and the PC 50 has a corresponding password conversion table 72 or 77, whichever appropriate. When both the storage medium and the PC are required to have respectively identical tables, only limited techniques can be used for inputting a password by means of a jog dial 12 or a multi-switch 14.

For example, different tables as shown in FIGS. 20A and 20B may be used for inputting a password. In other words, it may be more convenient to the user when different tables are used depending on the number of digits of the password to be input or registered and/or the application of the password.

It may not necessary to store a conversion table in the ROMs 23 of the storage mediums 1, 2, 3 and 4. In other words, the conversion table may be acquired dynamically from the PC 50 so as to make the storage mediums adaptable to various modes of input operation. Although not shown, the conversion table may be a table on which icons of symbolic images are shown for selection. The password may be formed from a broad scope of elements to improve the security of the password if it is so arranged that any of the storage mediums 1, 2, 3 and 4 can dynamically acquire the conversion table from the PC 50.

While the operation of inputting a password is realized only by means of a jog dial 12 or a multi-switch 14 at the time of logging on the PKI controller 30 in each of the storage mediums 1, 2, 3 and 4 of the first, second, third and fourth embodiments, it may alternatively be so arranged that a password is input by means of a combination of a jog dial 12 or a multi-switch 14 and the keyboard of the PC 50.

For example, it may be so arranged that the PKI controller 30 can be logged on only when the password input from the keyboard and the password input from the jog dial 12 or the multi-switch 14 agree with each other (AND arrangement). Alternatively, it may be so arranged that the PKI controller 30 can be logged on only when the password input from the keyboard and either of the password input from the jog dial 12 or the password input from the multi-switch 14 agree with each other (OR arrangement).

Each of the storage mediums 1 and 2 may be provided with a dedicated switch that performs exactly the same function as when the function code ">" arranged in the password conversion table 60, the password selection table 72 or 77 is selected. As the dedicated switch is depressed, the cursor can be moved both in the x-coordinate direction and in the y-coordinate direction, corresponding to the rotation of the jog dial 12 on the password conversion table 60, the password selection table 72 or 77 instantaneously.

The password authentication technique that is employed in the storage mediums 1, 2, 3 and 4 of the first, second, third and fourth embodiments can be applied to a BIOS lock.

While each of the storage mediums 1, 2, 3 and 4 of the first, second, third and fourth embodiments includes a jog dial 12 or a multi-switch 14 as a password input means, the present invention is by no means limited thereto. For example, a track ball may be used as a password input means for the purpose of the present invention. In other words, any input means may be used for the purpose of the present invention so long as it can be arranged for a storage medium according to the invention such as the storage medium 1, 2, 3 or 4.

It should be understood by those skilled in the art that various modifications, combinations, sub-combinations and alterations may occur depending on design requirements and other factors insofar as they are within the scope of the appended claims or the equivalents thereof.

What is claimed is:

1. A removable information storage apparatus equipped with (1) a predetermined interface for connecting to an external appliance, (2) an information storage unit, and (3) a security unit with a limited access from the external appliance, the removable information apparatus further comprising:
    a password input unit used by a user to input at least a specified portion of a password for access to the removable information storage apparatus, the password composed of a number of characters, and the specified portion of the password being (i) a plurality of consecutive or nonconsecutive characters in the password that are selected for input by the user and (ii) consisting of a smaller number of characters than the number of characters of the password;
    a password collating unit that collates at least the specified portion of the password input by the user;
    an access authorizing unit that authorizes an access to the security unit from the external appliance connected to the removable information storage apparatus in response to the collation of at least the specified portion of the password by the password collating unit; and
    memory having a password table,
    wherein,
        the password remains on the removable information storage apparatus only and is not output to the external appliance, and
        the password input unit is configured for inputting the characters of the password as desired character codes selected by the user from the password table where a plurality of character codes, including the character codes constituting the password, are displayed one-dimensionally or two-dimensionally, the password input unit being either (a) a jog dial for inputting the characters of the password by selecting each of the desired character codes in a predetermined one-dimensional direction from the password table so as to correspond to a rotary operation in a one-dimensional direction and finalizing the selected desired character code selection by depressing the jog dial, or (b) a multi-switch for inputting the characters of the password by selecting each of the desired character codes from the password table so as to correspond to a rotary operation in a one-dimensional direction or in two-dimensional directions and finalizing the selected desired character code selection by a depressing operation.

2. The apparatus according to claim 1, wherein the plurality of consecutive or nonconsecutive characters in the password that are selected for input by the user are randomly selected.

3. The apparatus according to claim 1, wherein the specified portion of the password is a string of consecutive characters in the password.

4. The apparatus according to claim 1, wherein the security unit further comprises:
    a first storage unit having (a) a first storage region that authorizes access from the external appliance connected to the removable information storage apparatus, and
    (b) a second storage region that limits access from the external appliance connected to the removable information storage apparatus.

5. The apparatus according to claim 1, further comprising a PKI (public key infrastructure) controller as the security unit, the PKI controller including:
    (a) a PKI processing unit which generates a public key and a private key according to the PKI system and executing a predetermined security process using the generated private key, and
    (b) a second storage unit having a write-only region to which the private key generated by the PKI processing unit is written and that cannot be read out externally.

6. The apparatus according to claim 1, wherein the password input unit is the jog dial.

7. The apparatus according to claim 6, further comprising:
    a switching unit which switches a selecting direction of the desired character codes if the password table is two-dimensionally arranged.

8. The apparatus according to claim 7, wherein the switching unit is adapted to switch the selecting direction of the password table in response to a selection of one of the character codes in the plurality of character codes arranged two-dimensionally in the password table.

9. The apparatus according to claim 1, wherein the password input unit is the multi-switch.

10. The apparatus according to claim 1, wherein the password table is acquired dynamically from the external appliance connected to the removable information storage apparatus.

11. The apparatus according to claim 9, further comprising:
   a display unit which displays each of the character codes input via the password input unit.

12. A removable information storage apparatus equipped with (1) a predetermined interface for connecting to an external appliance, (2) an information storage unit, and (3) a security unit with a limited access from the external appliance, the removable information apparatus further comprising:
   a password input unit used by a user to input at least a specified portion of a password for access to the removable information storage apparatus, the password composed of a number of characters, and the specified portion of the password being (i) a plurality of consecutive or nonconsecutive characters in the password that are selected for input by the user and (ii) consisting of a smaller number of characters than the number of characters of the password;
   a password collating unit that collates at least the specified portion of the password input by the user;
   an access authorizing unit that authorizes an access to the security unit from the external appliance connected to the removable information storage apparatus in response to the collation of at least the specified portion of the password by the password collating unit;
   a memory having a password table;
   a password register that stores the password temporarily collated by the password collating unit; and
   a timer for counting the time since the time when the authorization of access to the security unit by the access authorizing unit is cancelled,
   wherein,
      the password remains on the removable information storage apparatus only and is not output to the external appliance,
      the password input unit is configured for inputting the characters of the password as desired character codes selected by the user from the password table where a plurality of character codes, including the character codes constituting the password, are displayed one-dimensionally or two-dimensionally,
      the password collating unit is configured to automatically collate the password stored in the password register when the removable information storage apparatus receives a request for accessing the security unit provided that the time counted by the timer is within a predetermined period of time, and
      the access authorizing unit is configured to authorize an access to the security unit from the external appliance connected to the removable information storage apparatus in response to the automatic collation of the password by the password collating unit.

13. A removable information storage apparatus equipped with (1) a predetermined interface for connecting to an external appliance, (2) an information storage unit, and (3) a security unit with a limited access from the external appliance, the removable information apparatus further comprising:
   a password input unit used by a user to input a specified portion of a password for access to the removable information storage apparatus, the password composed of a number of characters, and the specified portion of the password being (i) a plurality of consecutive or nonconsecutive characters in the password that are selected for input by the user and (ii) consisting of a smaller number of characters than the number of characters of the password;
   a password collating unit that collates the specified portion of the password input by the user;
   an access authorizing unit that authorizes an access to the security unit from the external appliance connected to the removable information storage apparatus in response to the collation of the specified portion of the password by the password collating unit;
   a memory having a password table; and
   a notifying unit which notifies of a current number of characters input for the password via the password input unit; and
   wherein,
      the password remains on the removable information storage apparatus only and is not output to the external appliance,
      the password input unit is configured for inputting the characters of the password as desired character codes selected by the user from the password table where a plurality of character codes, including the character codes constituting the password, are displayed one-dimensionally or two-dimensionally, and
      the notifying unit comprises a light emitting unit which notifies of the current number of characters input for the password by emitting light.

14. A removable information storage apparatus equipped with (1) a predetermined interface for connecting to an external appliance, (2) an information storage unit, and (3) a security unit with a limited access from the external appliance, the removable information apparatus further comprising:
   a password input unit used by a user to input a specified portion of a password for access to the removable information storage apparatus, the password composed of a number of characters, and the specified portion of the password being (i) a plurality of consecutive or nonconsecutive characters in the password that are selected for input by the user and (ii) consisting of a smaller number of characters than the number of characters of the password;
   a password collating unit that collates the specified portion of the password input by the user;
   an access authorizing unit that authorizes an access to the security unit from the external appliance connected to the removable information storage apparatus in response to the collation of the specified portion of the password by the password collating unit;
   a memory having a password table; and
   a notifying unit which notifies of a current number of characters input for the password via the password input unit; and
   wherein,
      the password remains on the removable information storage apparatus only and is not output to the external appliance,
      the password input unit is configured for inputting the characters of the password as desired character codes selected by the user from the password table where a plurality of character codes, including the character codes constituting the password, are displayed one-dimensionally or two-dimensionally, and the notifying unit comprises an oscillation unit which notifies of the current number of characters input for the password by oscillating.

15. The apparatus according to claim 1, wherein the user uses a combination of the password input unit and an input means on the external appliance for a password input, and the password collating unit combines the password input from the external appliance and the password input from the password input unit for collation.

16. A password collation method for use with a removable information storage apparatus equipped with (1) a predetermined interface for connecting to an external appliance, (2) an information storage unit, (3) a security unit with a limited access from the external appliance, and (4) a password collating unit, the method comprising:

a user inputting at least a specified portion of a password for access to the removable information storage apparatus, the password stored in the information storage apparatus only, without being output to the external appliance connected to the removable information storage apparatus, the password composed of a number of characters, and the specified portion of the password being (i) a plurality of consecutive or nonconsecutive characters in the password that are selected for input by the user and (ii) consisting of a smaller number of characters than the number of characters of the password;

collating at least the specified portion of the password input by the user by the password collating unit; and authorizing an access to the security unit from the external appliance connected to the removable information storage apparatus in response to the collation of at least the specified portion of the password by the password collating unit, wherein, the information storage apparatus further comprises (i) a password input unit used by a user to input at least the specified portion of the password for access to the removable information storage apparatus and (ii) a memory having a password table, and the password input unit is configured for inputting the characters of the password as desired character codes selected by the user from the password table where a plurality of character codes, including the character codes constituting the password, are displayed one-dimensionally or two-dimensionally, the password input unit being either (a) a jog dial for inputting the characters of the password by selecting each of the desired character codes in a predetermined one-dimensional direction from the password table so as to correspond to a rotary operation in a one-dimensional direction and finalizing the selected desired character code selection by depressing the jog dial, or (b) a multi-switch for inputting the characters of the password by selecting each of the desired character codes from the password table so as to correspond to a rotary operation in a one-dimensional direction or in two-dimensional directions and finalizing the selected desired character code selection by a depressing operation.

17. The method apparatus according to claim 16, wherein the plurality of consecutive or nonconsecutive characters in the password that are selected for input by the user are randomly selected.

18. The method according to claim 16, wherein the specified portion of the password is a string of consecutive characters in the password.

19. The method according to claim 16, wherein the password input unit is the jog dial.

20. The method according to claim 18, wherein the password input unit is the multi-switch.

* * * * *